(12) United States Patent
Birmiwal et al.

(10) Patent No.: US 11,689,459 B2
(45) Date of Patent: Jun. 27, 2023

(54) CUSTOM ROUTING INFORMATION BASES FOR NETWORK DEVICES

(71) Applicant: Arista Networks, Inc., Santa Clara, CA (US)

(72) Inventors: Sharad Birmiwal, Surrey (CA); Akshay Gattani, Sunnyvale, CA (US); Sandeep Betha, Burnaby (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 89 days.

(21) Appl. No.: 16/919,005

(22) Filed: Jul. 1, 2020

(65) Prior Publication Data

US 2022/0006739 A1 Jan. 6, 2022

(51) Int. Cl.
*H04L 45/745* (2022.01)
*H04L 45/00* (2022.01)

(52) U.S. Cl.
CPC .......... *H04L 45/745* (2013.01); *H04L 45/54* (2013.01)

(58) Field of Classification Search
CPC .............................. H04L 45/745; H04L 45/54
See application file for complete search history.

(56) References Cited

U.S. PATENT DOCUMENTS

| | | | | |
|---|---|---|---|---|
| 7,493,412 B2* | 2/2009 | Herkersdorf | ............ | H04L 45/00 370/351 |
| 2006/0164995 A1* | 7/2006 | Djernaes | ............... | H04L 45/306 370/238 |
| 2008/0013549 A1* | 1/2008 | Okagawa | ............... | H04L 45/123 370/397 |
| 2009/0109852 A1* | 4/2009 | Grover | ................ | H04L 45/7457 370/235 |
| 2009/0285089 A1* | 11/2009 | Srinivasan | ............ | H04L 45/026 370/218 |
| 2010/0002722 A1* | 1/2010 | Porat | ....................... | H04L 45/04 370/467 |
| 2011/0235503 A1* | 9/2011 | Chen | .................... | H04L 41/0846 370/219 |
| 2012/0147888 A1* | 6/2012 | Lu | ........................... | H04L 45/54 370/392 |
| 2013/0070753 A1* | 3/2013 | Sahni | ..................... | H04L 45/02 370/351 |
| 2015/0124806 A1* | 5/2015 | Banerjee | ............... | H04L 45/748 370/389 |

\* cited by examiner

*Primary Examiner* — Kevin M Cunningham
(74) *Attorney, Agent, or Firm* — Fountainhead Law Group P.C.

(57) ABSTRACT

Some embodiments provide a method, executable by a first network device, that receives a set of commands to create a custom routing table. The set of commands specifies that the custom routing table be configured to resolve next hops for routing protocol paths using routes determined by a subset of a set of protocols used by a predefined routing table of the first network device to determine next hops for routing protocol paths. Based on the set of commands, the method further generates the custom routing table. The method also receives a routing protocol path from a second network device. The method further uses one of the custom routing table and the predefined routing table to resolve a next hop for the routing protocol path.

20 Claims, 19 Drawing Sheets

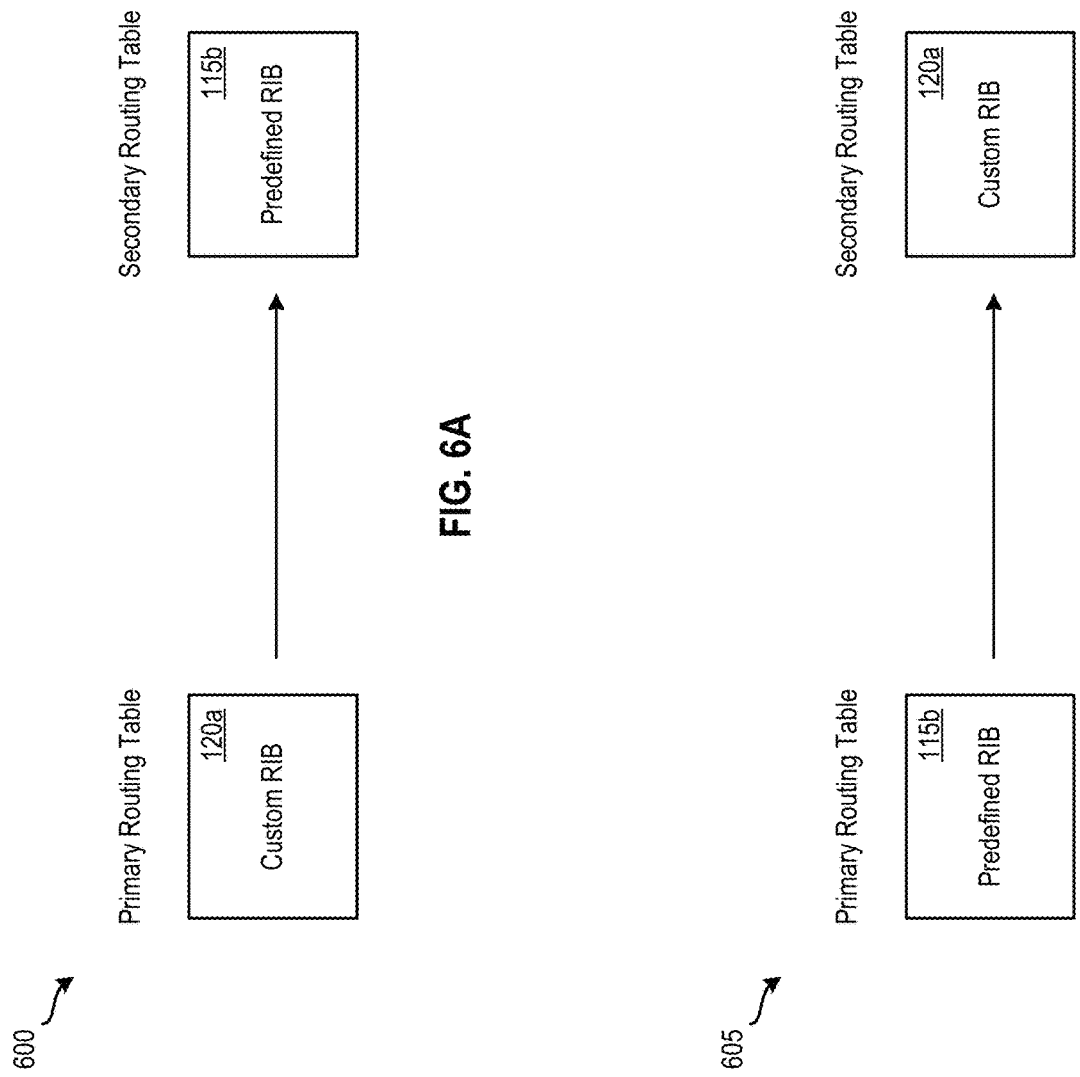

CUSTOM ROUTING INFORMATION BASES FOR NETWORK DEVICES

BACKGROUND

The architecture of many network devices are divided into two main parts: a control plane and a data plane (also referred to as a forwarding plane). The control plane is the part of the architecture involved in determining and managing the network topology around a network device. A network device can receive information about the network topology from a number of different routing protocols. The network topology can be implemented by a routing table that stores a list of routes (e.g., destination addresses and next hop interfaces). The data plane is part of the architecture of a network device that determines what to do with ingress packets. A forwarding table that contains destination addresses and next hop information can be used to determine how to forward ingress packets.

Routing information bases (RIBs) are routing tables in the control plane that are configured to store network routes. Network devices come preconfigured with a set of global RIBs. For example, a network device can be preconfigured with a global unicast RIB and a global tunnel RIB. These preconfigured RIBs are populated with network routes that the network device receives from any routing protocols supported by the network device. The network device is preconfigured to use one or more RIBs to resolve next hops for network paths. In cases where multiple RIBs are preconfigured to resolve next hops for network paths, the order in which RIBs are used to resolve next hops is also preconfigured. Because network devices come preconfigured in this manner, users do not have any control over which routing protocols can and cannot be used to populate different RIBS, which RIBs can be used to resolve different types of network paths, and/or the order in which RIBs are used to resolve network paths.

The following detailed description and accompanying drawings provide a better understanding of the nature and advantages of various embodiments of the present disclosure.

BRIEF DESCRIPTION OF THE DRAWINGS

FIGS. 6A and 6B illustrate examples of next hop resolution configurations according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for providing custom routing information bases (RIBs) for network devices. RIBs may also be referred to herein as routing tables. In some embodiments, a network device includes one or more predefined RIBs. The network device may include a feature for creating custom RIBs. For example, the network device can receive from a user a set of commands to create a custom RIB. One possible predefined RIB is populated with tunnel information received from a set of routing protocols (e.g., all possible routing protocols). The feature may allow a user to specify that the custom RIB is to be populated with tunnel information from a subset of the set of routing protocols. A user can specify a custom preference value for each protocol. The preference values may be used to determine which tunnel to use to populate the custom RIB when dealing with competing tunnels (e.g., tunnels with the same tunnel end point) received from different routing protocols. For a particular routing protocol, the feature can allow a user to specify certain tunnels that are allowed to be populated in the custom RIB. Tunnels that are not specified are not used to populate the custom RIB.

In some embodiments, the feature allows a user to create different resolution policies (also referred to as a resolution configuration or a next hop resolution configuration) to resolve incoming routing protocol paths. For instance, a user can specify a custom RIB be used as a primary routing table to resolve incoming routing protocol paths and a predefined RIB as a secondary routing table or vice versa. Incoming routing protocol paths can belong to different address families. As such, the feature may allow a user to specify different resolution policies to resolve incoming routing protocol paths for different address families.

1. Example Network Device

Figure 1:
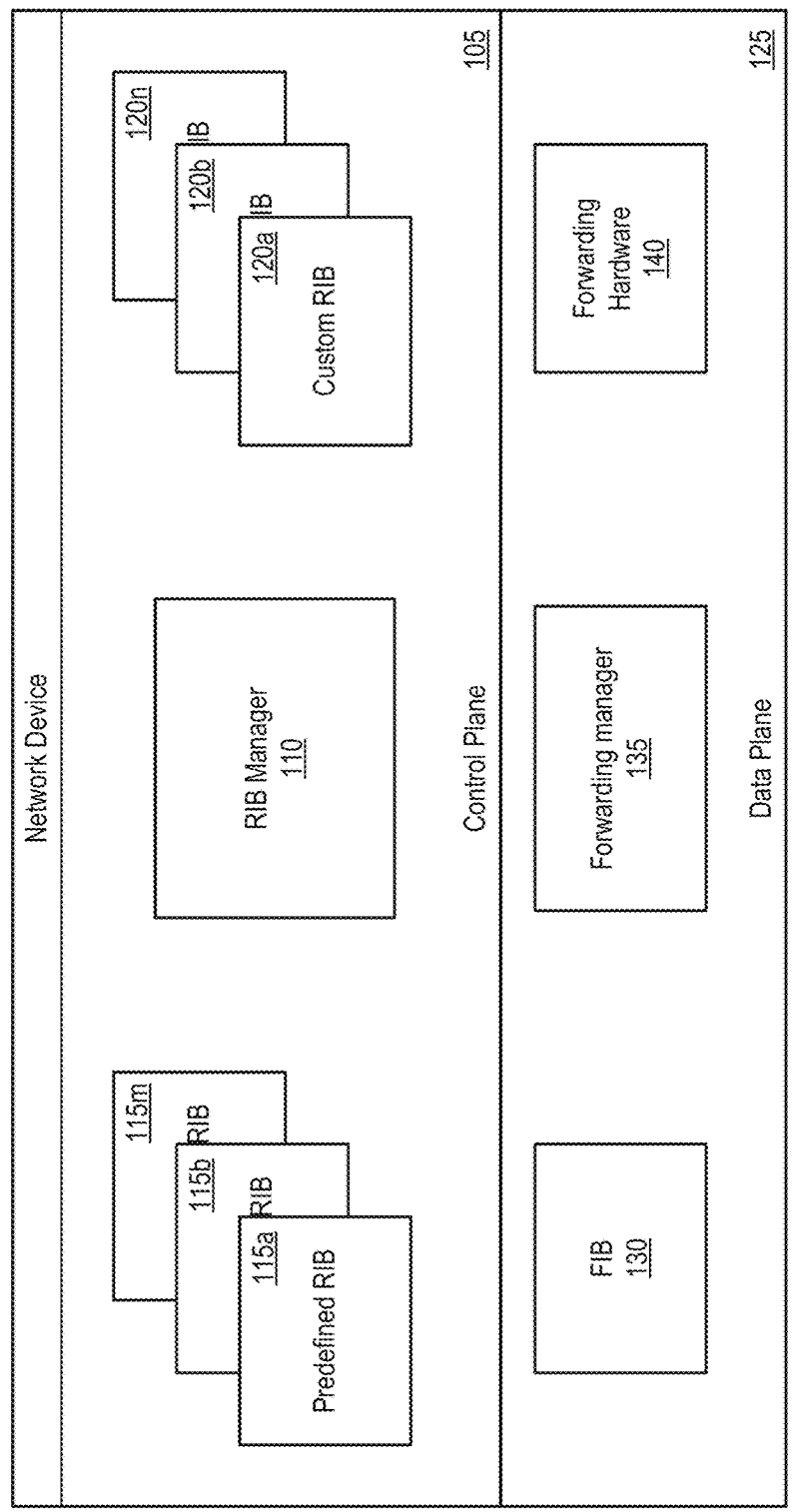
FIG. 1 illustrates a network device according to some embodiments.

FIG. 1 illustrates a network device 100 according to some embodiments. As shown, network device includes control plane 105 and data plane 125. Control plane 105 is configured to determine and manage network topologies in which network device 100 belongs. Control plane 105 includes RIB manager 110, predefined RIBs 115*a-m*, and custom RIBs 120*a-n*.

RIB manager 110 is responsible for populating predefined RIBs 115*a-m* and custom RIBs 120*a-n* with network topology information. For instance, when network device 100 receives network topology information from a routing protocol, RIB manager 110 determines which of predefined RIBs 115*a-m* and custom RIBs 120*a-n* can potentially be populated with the network topology information. Then, RIB manager 110 determines whether to populate the determined predefined RIBs 115*a-m* and custom RIBs 120*a-n* with the network topology information based on respective configurations associated with the predefined RIBs 115*a-m* and custom RIBs 120*a-n*.

RIB manager 110 also handles the resolution of routing protocol paths. Examples of routing protocol paths include border gateway protocol (BGP) unicast paths (e.g., Internet Protocol (IP) version 4 (IPv4) unicast paths, IP version 6 (IPv6) unicast paths, etc.). For instance, if network device 100 receives a BGP unicast path, RIB manager 110 determines a resolution policy to use. In some embodiments, a resolution policy specifies a predefined RIB 115 or a custom RIB 120 as a primary routing table used to resolve routing protocol paths. A resolution policy also specifies a predefined RIB 115 or a custom RIB 120 as a secondary routing table used to resolve routing protocol paths when the primary routing table is unable to resolve a particular routing protocol path. To resolve a particular routing protocol path using a particular routing table, RIB manager 110 performs a lookup on the routing table to determine whether the routing table has an entry that matches the particular routing protocol path. If so, RIB manager 110 uses the entry to populate forwarding information base (FIB) 130.

Each of the predefined RIBs 115*a-m* is configured to store information about a network topology in which network device 100 belongs. Examples of predefined RIBs include a system unicast RIB configured to store unicast routes, a system tunnel RIB configured to store network tunnels, a system connected RIB configured to store information about connected routes (e.g., routes to attached network devices), etc. Predefined RIBs 115*a-m* are created with a predefined configuration. For example, a predefined RIB 115 that is a system tunnel RIB can be preconfigured to be populated with network tunnel information that network device 100 receives via any routing protocol (e.g., a label distribution protocol (LDP), a Resource Reservation Protocol (RSVP), a segment routing (SR) protocol, etc.) used to distribute network tunnel information among network devices. In some cases, such a predefined RIB 115 can be implemented by a routing table that stores a list of network tunnel routes (e.g., destination addresses and next hop interfaces). A predefined RIB 115 may also be preconfigured with preference values for the routing protocols.

Each of the custom RIBs 120*a-n* can store information about a network topology in which network device 100 belongs. Custom RIBs 120*a-n* are generated by a user of network device 100 via commands received through an interface (e.g., a command line interface (CLI), a graphical user interface (GUI), etc.) provided by network device 100. The commands can specify which routing protocols can be used to populate a custom RIB 120, preference values for the routing protocols, which paths for a routing protocol are allowed to be used to populate the custom RIB 120, etc.

Data plane 125 is configured to determine how to forward ingress packets. As illustrated in FIG. 1, data plane 125 includes FIB 130, forwarding manager 135, and forwarding hardware 140. FIB 130 is configured to store information on how to forward data. For instance, FIB 130 include a forwarding table that includes entries of destination addresses and associated next hop information (e.g., egress interface, media access control (MAC) addresses, etc.).

Forwarding manager 135 is responsible for programming forwarding hardware 140 with forwarding data. For example, forwarding manager 135 can use the information contained in FIB 130 to program forwarding hardware 140. Forwarding hardware 140 is hardware that can be configured to forward packets. Forwarding hardware 140 may be implemented as an application-specific integrated circuit (ASIC).

2. Examples of Populating RIBs

Figure 2A:
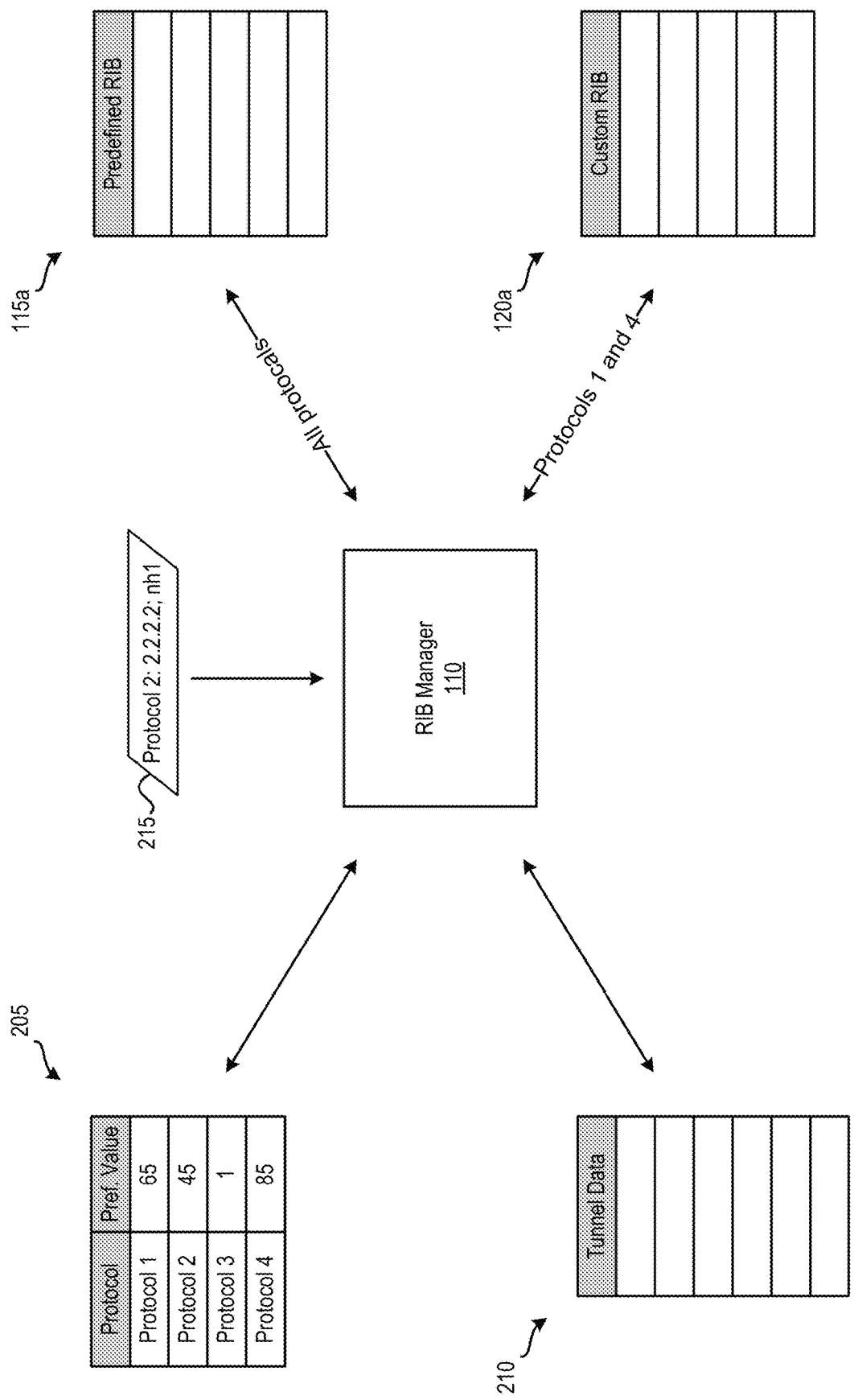
FIGS. 2A-2D illustrate an example of populating a custom RIB based on default preference values according to some embodiments.

This section will describe several examples of populating a predefined RIB and a custom RIB with network topology information. These examples will be described by reference to FIGS. 2A-2D, 3A, 3B, and 4A-4D. A first example is shown in FIGS. 2A-2D, which illustrate an example of populating a custom RIB based on default preference values according to some embodiments. Specifically, FIGS. 2A-2D illustrates an example of RIB manager 110 populating predefined RIB 115*a* and custom RIB 120*a* with tunnel data. FIG. 2A depicts preference table 205, tunnel data table 210, predefined RIB 115*a*, and custom RIB 120*a*. In this example, preference table 205 and tunnel data table 210 are tables managed by RIB manager 110 in control plane 105. In some embodiments, preference table 205 and tunnel data table 210 can be managed by another component in network device 100 (e.g., RIB manager 110 does not write to preference table 205 and tunnel data table 210). In some such embodiments, preference table 205 and tunnel data table 210 serve as inputs for RIB manager 110. Preference table 205 is configured to store predefined default preference values for different routing protocols. In this example, preference table 205 stores a preference value of 65 for routing protocol 1, a preference value of 45 for routing protocol 2, a preference value of 1 for routing protocol 3, and a preference value of 85 for routing protocol 4. In some embodiments, a lower preference value indicates a higher preference and vice versa. Tunnel data table 210 is configured to store tunnel data received from a routing protocol. At the stage shown in FIG. 2A, RIB manager 110 has not previously received any tunnel data and has not processed tunnel data 215. Therefore, tunnel data table 210 is empty. For this example, predefined RIB 115*a* is configured so that it can be populated by tunnel data from any of the routing protocols 1-4. Custom RIB 120*a* is configured so that it can be populated by tunnel data from routing protocols 1 and 4. The default preference values for routing protocols 1-4 are configured to be used for predefined RIB 115*a* and custom RIB 120*a* in this example. FIG. 2A also shows RIB manager 110 receiving tunnel data 215. Here, network device 100 receives tunnel data 215 from another network device (not shown) through routing protocol 2. Tunnel data 215 specifies a tunnel end point with an IPv4 address of 2.2.2.2.

Figure 2B:
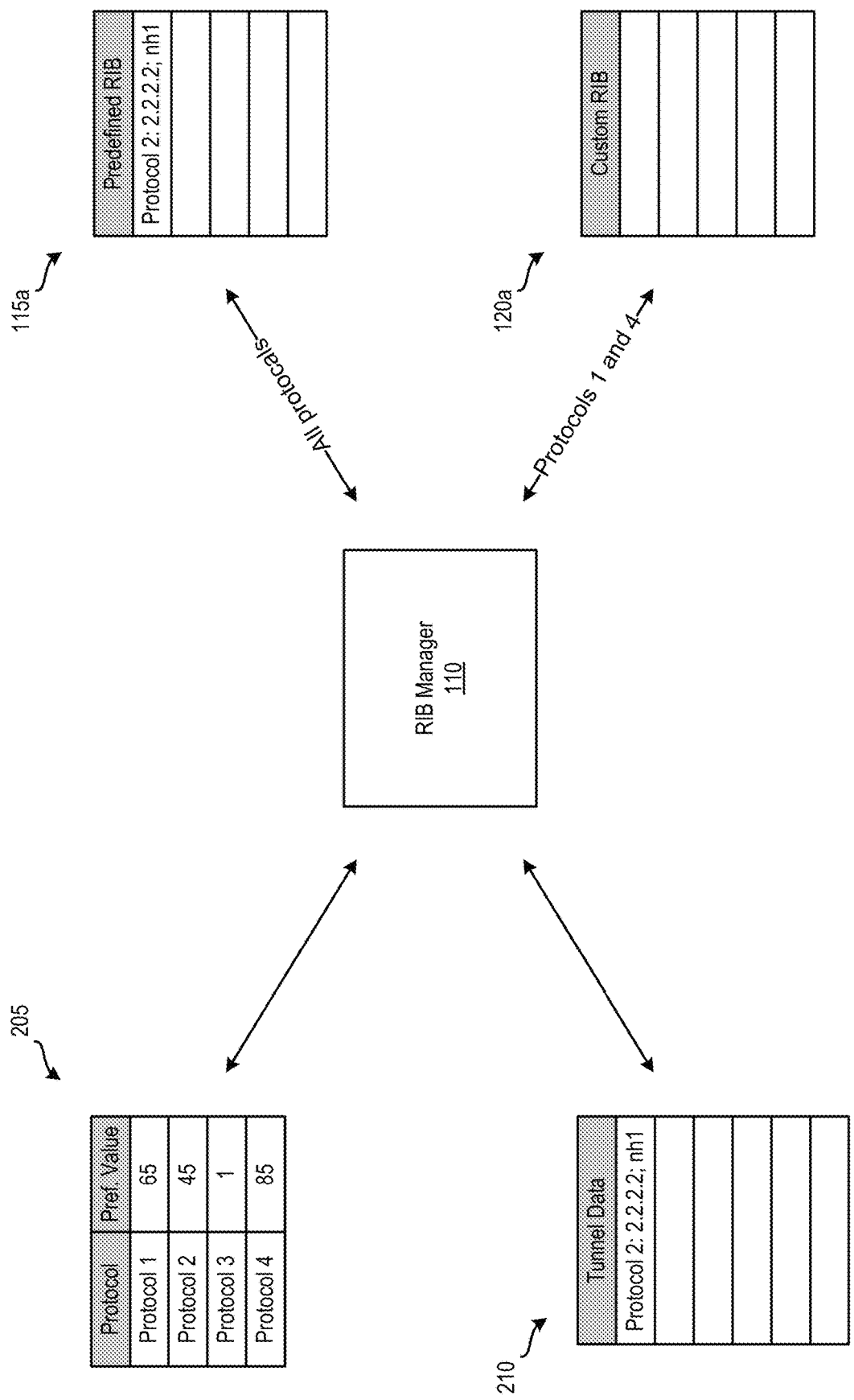

FIG. 2B illustrates tunnel data table 210, predefined RIB 115*a*, and custom RIB 120*a* after RIB manager 110 processes tunnel data 215. When RIB manager 110 receives tunnel data 215, RIB manager 110 stores it in tunnel data table 210, as depicted in FIG. 2B. Then, RIB manager 110 determines whether tunnel data table 210 has any other entries with the same tunnel end point of 2.2.2.2. In this case, there are none so RIB manager 110 determines the next hop, represented by nh1 in this example, to which data is forwarded in order to reach the tunnel end point 2.2.2.2 and populates predefined RIB 115*a* with the tunnel end point 2.2.2.2 and the next hop nh1. Because custom RIB 120*a* is configured to be populated by tunnel data from routing protocols 1 and 4, RIB manager 110 does not populate custom RIB 120*a* with tunnel data 215.

Figure 2C:
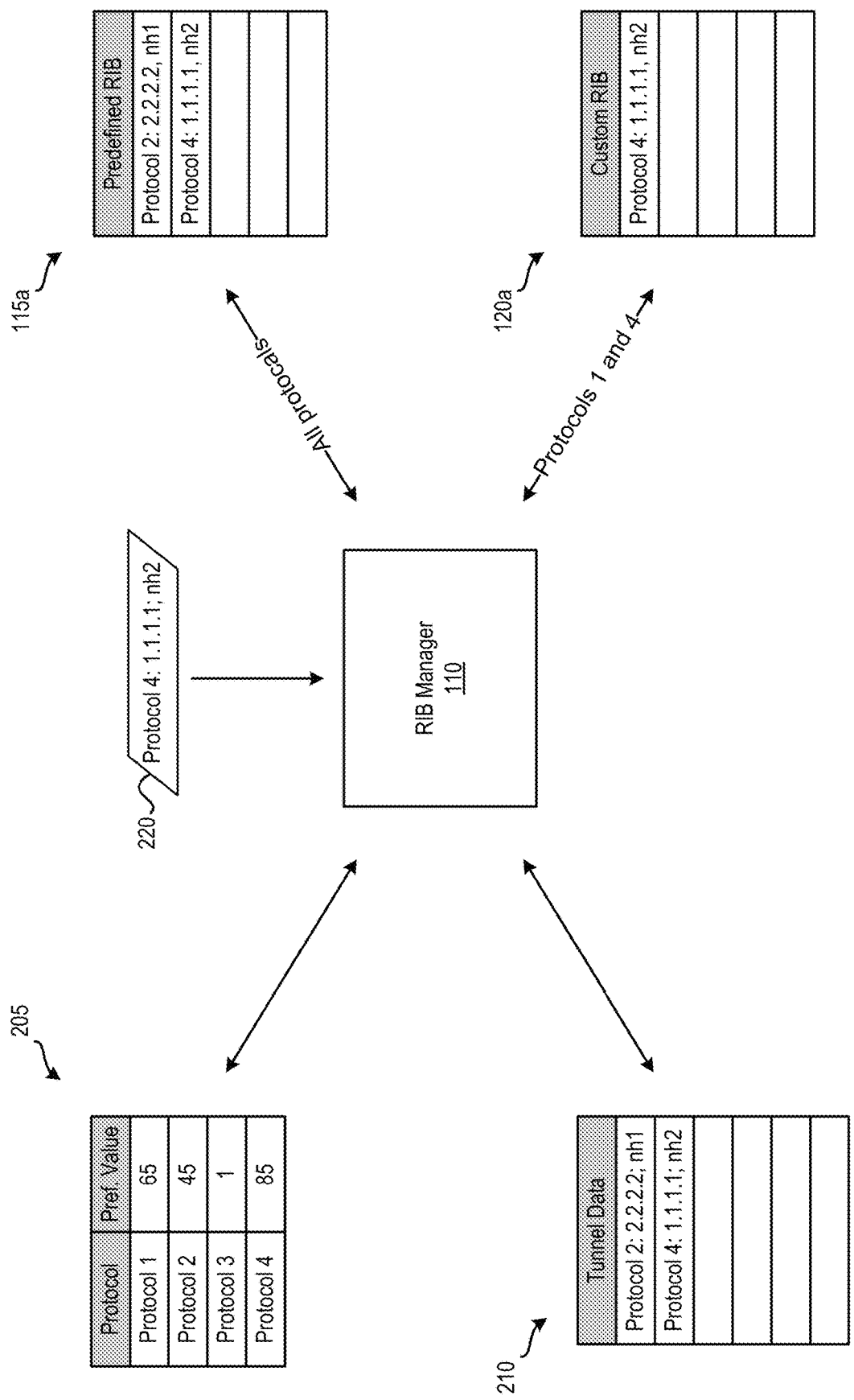

FIG. 2C illustrates RIB manager 110 receiving another tunnel data. In particular, FIG. 2C shows RIB manager 110 receiving tunnel data 220 from routing protocol 4. For this example, network device 100 receives tunnel data 220 from another network device (not shown) through routing protocol 4. Tunnel data 220 specifies a tunnel end point with an IPv4 address of 1.1.1.1. Upon receiving tunnel data 220, RIB manager 110 stores it in tunnel data table 210. Next, RIB manager 110 determines whether tunnel data table 210 has any other entries with the same tunnel end point of 1.1.1.1. Here there are not any, so RIB manager 110 determines the next hop, represented by nh2 in this example, to which data is forwarded in order to reach the tunnel end point 1.1.1.1 and populates predefined RIB 115a with the tunnel end point 1.1.1.1 and the next hop nh2. As mentioned above, custom RIB 120a is configured to be populated by tunnel data from routing protocol 4. Therefore, RIB manager 110 also populates custom RIB 120a with the tunnel end point 1.1.1.1 and the next hop nh2, as shown in FIG. 2C.

Figure 2D:
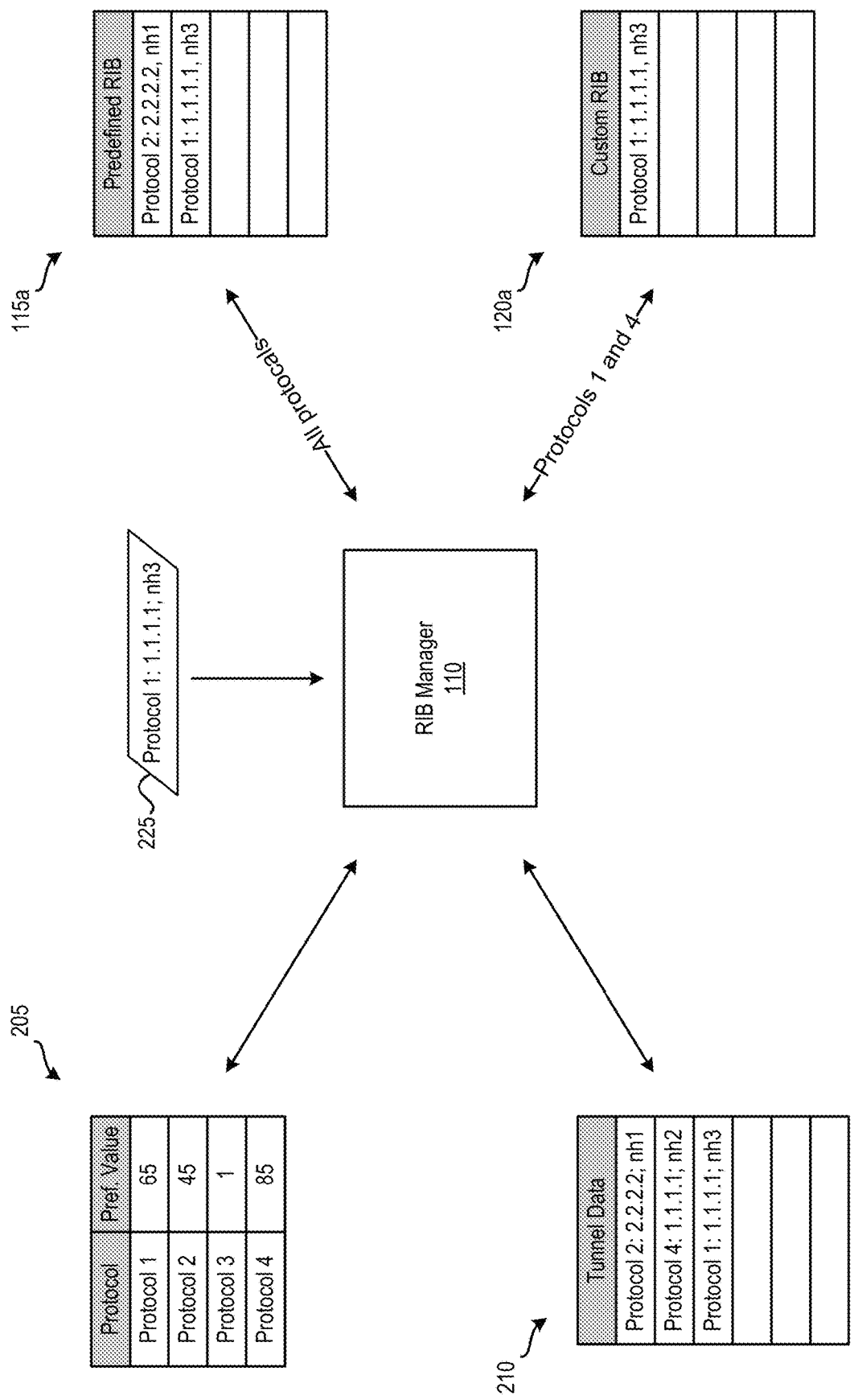

FIG. 2D illustrates RIB manager 110 receiving yet another tunnel data. Specifically, FIG. 2D illustrates RIB manager 110 receiving tunnel data 225 from routing protocol 1. In this example, network device 100 receives tunnel data 225 from another network device (not shown) through routing protocol 1. Tunnel data 225 specifies a tunnel end point with an IPv4 address of 1.1.1.1. Once RIB manager 110 receives tunnel data 225, RIB manager 110 stores it in tunnel data table 210, as shown in FIG. 2D. RIB manager 110 then determines whether tunnel data table 210 has any other entries with the same tunnel end point of 1.1.1.1. For this example, RIB manager 110 determines that tunnel data table 210 has another entry with the same tunnel end point that was received from routing protocol 4. Thus, RIB manager 110 accesses preference table 205 to identify the preference values for routing protocols 1 and 4. In this case, routing protocol 1 has a lower preference value than routing protocol 4 and, thus, routing protocol 1 has a higher preference. As such, RIB manager 110 determines the next hop, represented by nh3 in this example, to which data is forwarded in order to reach the tunnel end point 1.1.1.1 and replaces the entry containing tunnel data 220 with tunnel data determined from tunnel data 225. As described above, custom RIB 120a is configured to be populated by tunnel data from routing protocol 1. Hence, RIB manager 110 also replaces the entry in custom RIB 120a containing tunnel data 220 with tunnel data determined from tunnel data 225.

Figure 3A:
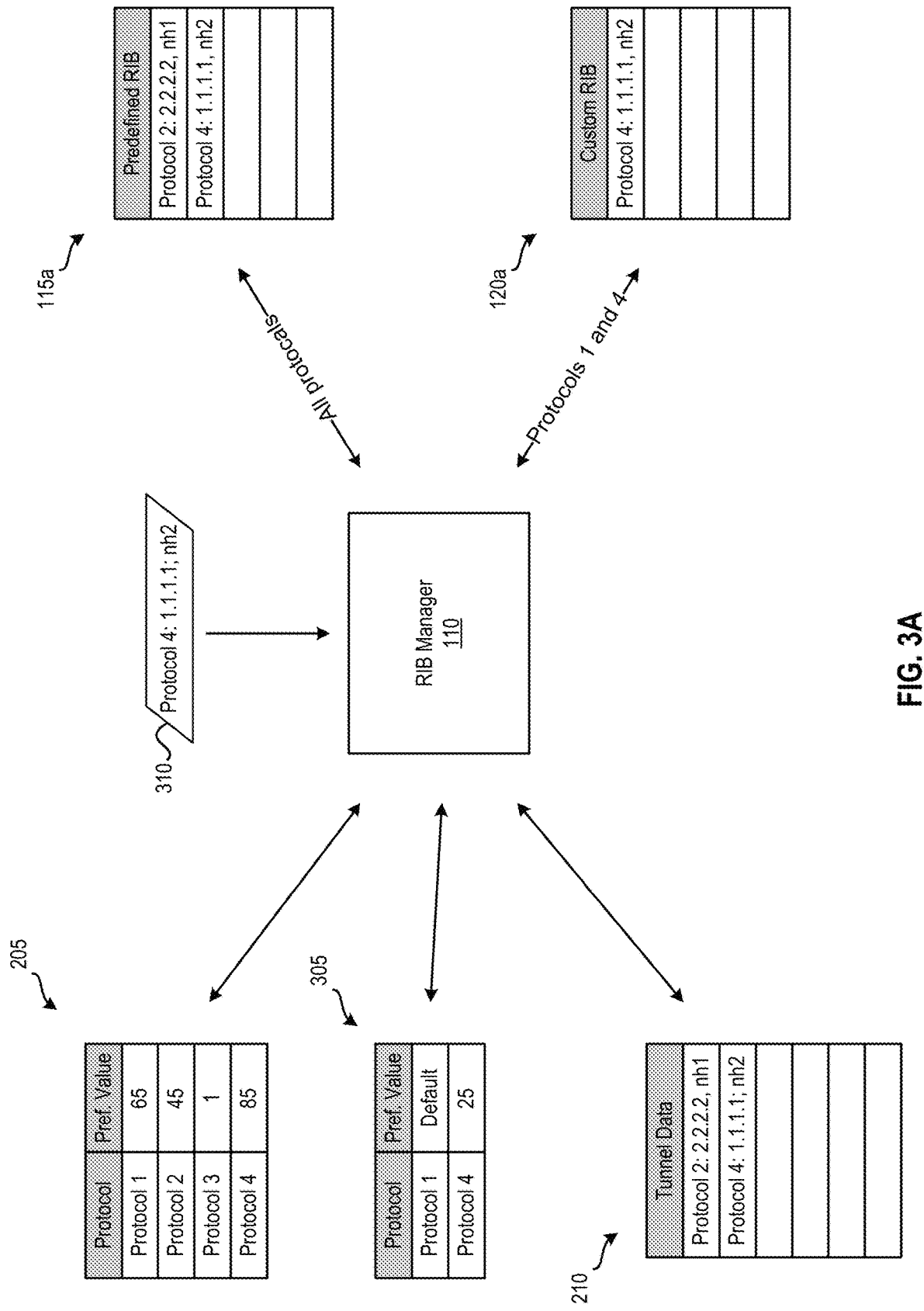
FIGS. 3A and 3B illustrate an example of populating a custom RIB based on custom preference values according to some embodiments.
Figure 3B:
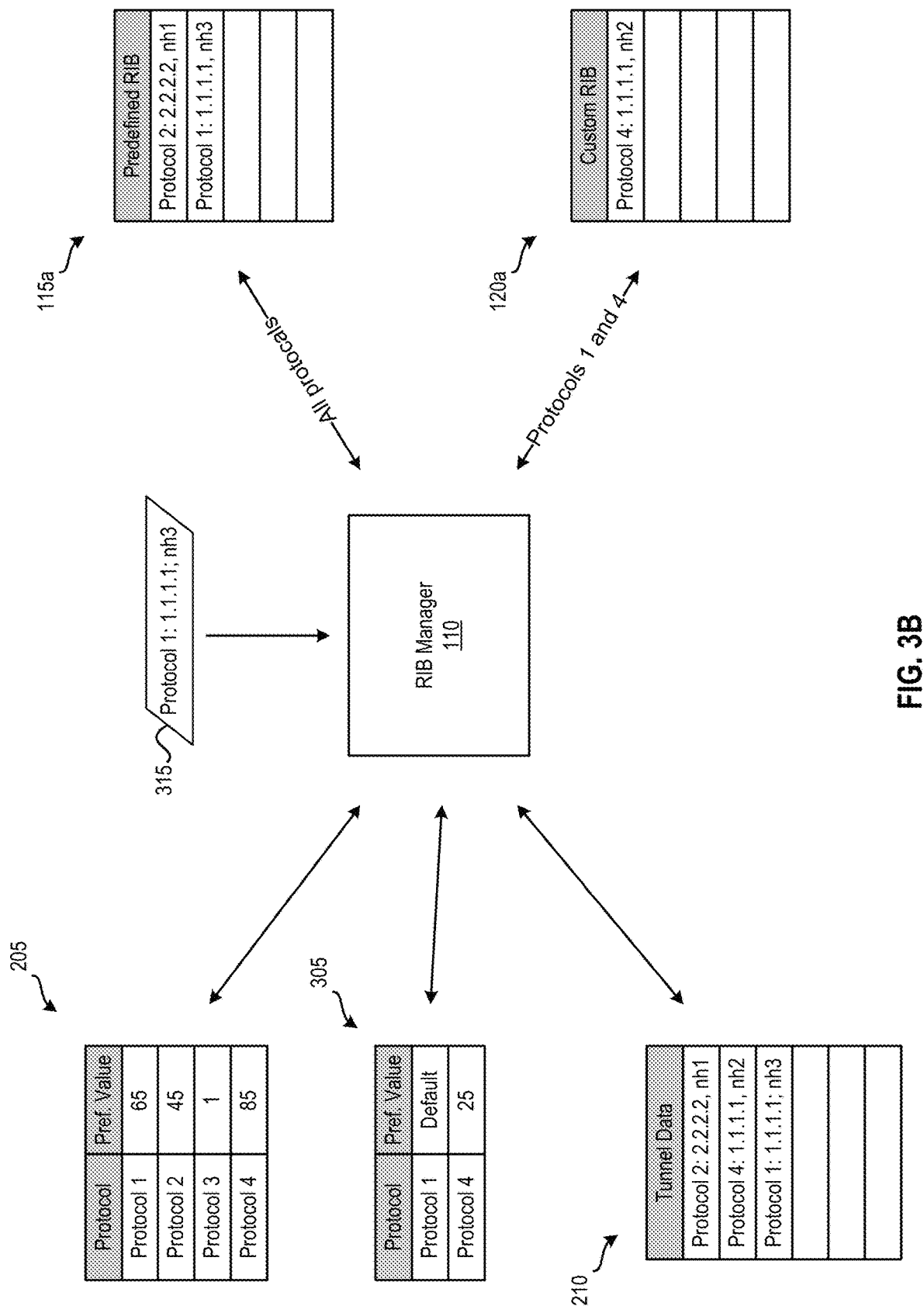

A second example will now be described by reference to FIGS. 3A and 3B. Specifically, FIGS. 3A and 3B illustrate an example of populating a custom RIB based on custom preference values according to some embodiments. This example continues from the stage of preference table 205, tunnel data table 210, RIB manager 110, predefined RIB 115a, and custom RIB 120a shown in FIG. 2B. However, here, a custom preference table 305 has been configured for custom RIB 120a. Custom preference table 305 is configured to store custom preference values for the routing protocols that custom RIB 120a is configured to support (routing protocols 1 and 4 in this example). As shown, custom preference table 305 stores a preference value of "default" for routing protocol 1. A preference value of "default" indicates to use the default preference value stored in preference table 205. In this example, the default preference value stored in preference table 205 for routing protocol 1 is 65. Additionally, FIG. 3A shows custom preference table 305 storing a preference value of 25 for routing protocol 4. Therefore, the custom preference value specified for routing protocol 4 in custom preference table 305 is used instead of the default preference value specified for routing protocol 4 in preference table 205. This illustrates how a user is able to override predefined preference values with custom preference values for a custom RIB.

FIG. 3A also shows RIB manager 110 receiving tunnel data 310. In this example, network device 100 receives tunnel data 310 from another network device (not shown) through routing protocol 4. Tunnel data 310 specifies a tunnel end point with an IPv4 address of 1.1.1.1. After RIB manager 110 receives tunnel data 310, RIB manager 110 stores it in tunnel data table 210, as shown in FIG. 3A. Next, RIB manager 110 determines whether tunnel data table 210 has any other entries with the same tunnel end point of 1.1.1.1. Here, there are none so RIB manager 110 determines the next hop, represented by nh2 in this example, to which data is forwarded in order to reach the tunnel end point 1.1.1.1 and populates predefined RIB 115a with the tunnel end point 1.1.1.1 and the next hop nh2. As custom RIB 120a is configured to be populated by tunnel data from routing protocol 4, RIB manager 110 also populates custom RIB 120a with the tunnel end point 1.1.1.1 and the next hop nh2.

FIG. 3B illustrates RIB manager 110 receiving tunnel data 315. For this example, network device 100 receives tunnel data 315 from another network device (not shown) through routing protocol 1. Tunnel data 315 specifies a tunnel end point with an IPv4 address of 1.1.1.1. When RIB manager 110 receives tunnel data 315, RIB manager 110 stores it in tunnel data table 210. Then, RIB manager 110 determines whether tunnel data table 210 has any other entries with the same tunnel end point of 1.1.1.1. Here, RIB manager 110 determines that tunnel data table 210 has another entry with the same tunnel end point that was received from routing protocol 4. As such, RIB manager 110 accesses preference table 205 to identify the preference values for routing protocols 1 and 4 to use for predefined RIB 115a. Routing protocol 1 has a lower preference value than routing protocol 4 and, therefore, routing protocol 1 has a higher preference. Hence, RIB manager 110 determines the next hop, represented by nh3 in this example, to which data is forwarded in order to reach the tunnel end point 1.1.1.1 and replaces the entry containing tunnel data 310 with tunnel data determined from tunnel data 315. As explained above, custom RIB 120a is configured to be populated by tunnel data from routing protocol 1. Thus, RIB manager 110 accesses custom preference table 305 to identify the preference values for routing protocols 1 and 4 to use for custom RIB 120a. Because the preference value stored for routing protocol 1 in custom preference table 305 is "default," RIB manager 110 accesses preference table 205 to identify the preference value of 65 for routing protocol 1. In this case, routing protocol 4 has a higher preference than routing protocol 1. Accordingly, RIB manager 110 leaves the entry in custom RIB 120a containing tunnel data 310.

A third example will now be described by reference to FIGS. 4A-4D. In particular, FIGS. 4A-4D illustrate another example of populating a custom RIB based on custom preference values according to some embodiments. The third example also continues from the stage of preference table 205, tunnel data table 210, RIB manager 110, predefined RIB 115a, and custom RIB 120a shown in FIG. 2B. For this example, a custom preference table 405 has been configured for custom RIB 120a. Custom preference table 405 is configured to store custom preference values for the routing protocols that custom RIB 120a is configured to support (routing protocols 1 and 4 in this example). In addition, custom preference table 405 is configured to store routes that are allowed to be used to populate custom RIB 120a and corresponding preference values. Here, the routes are specified in terms of individual IPv4 addresses. One of ordinary skill in the art will appreciate that routes specified for custom preference table 405 may be sets of IPv4 addresses (e.g., several unique IPv4 addresses, one or more ranges of IPv4 addresses, one or more IPv4 subnets, etc.), individual IPv6 addresses, sets of IPv6 addresses (e.g., several unique IPv6 addresses, one or more ranges of IPv6 addresses, one or more IPv6 subnets, etc.), etc. Here, custom preference table 405 stores a preference value of 95 for an IPv4 address of 5.5.5.5 for routing protocol 1, a preference value of 25 for an IPv4 address of 1.1.1.1 for routing protocol 4, and a preference value of "default" for an IPv4 address of 5.5.5.5 for routing protocol 4. As described above, a preference value of "default" indicates to use the default preference value stored in preference table 205. For this example, the default preference value stored in preference table 205 for routing protocol 4 is 85. As such, the custom preference values specified for IPv4 for routing protocols 1 and 4 in custom preference table 405 is used instead of the default preference values specified for routing protocols 1 and 4 in preference table 205. This shows how a user may override predefined preference values for a custom RIB with custom preference values for specific IPv4 addresses.

Figure 4A:
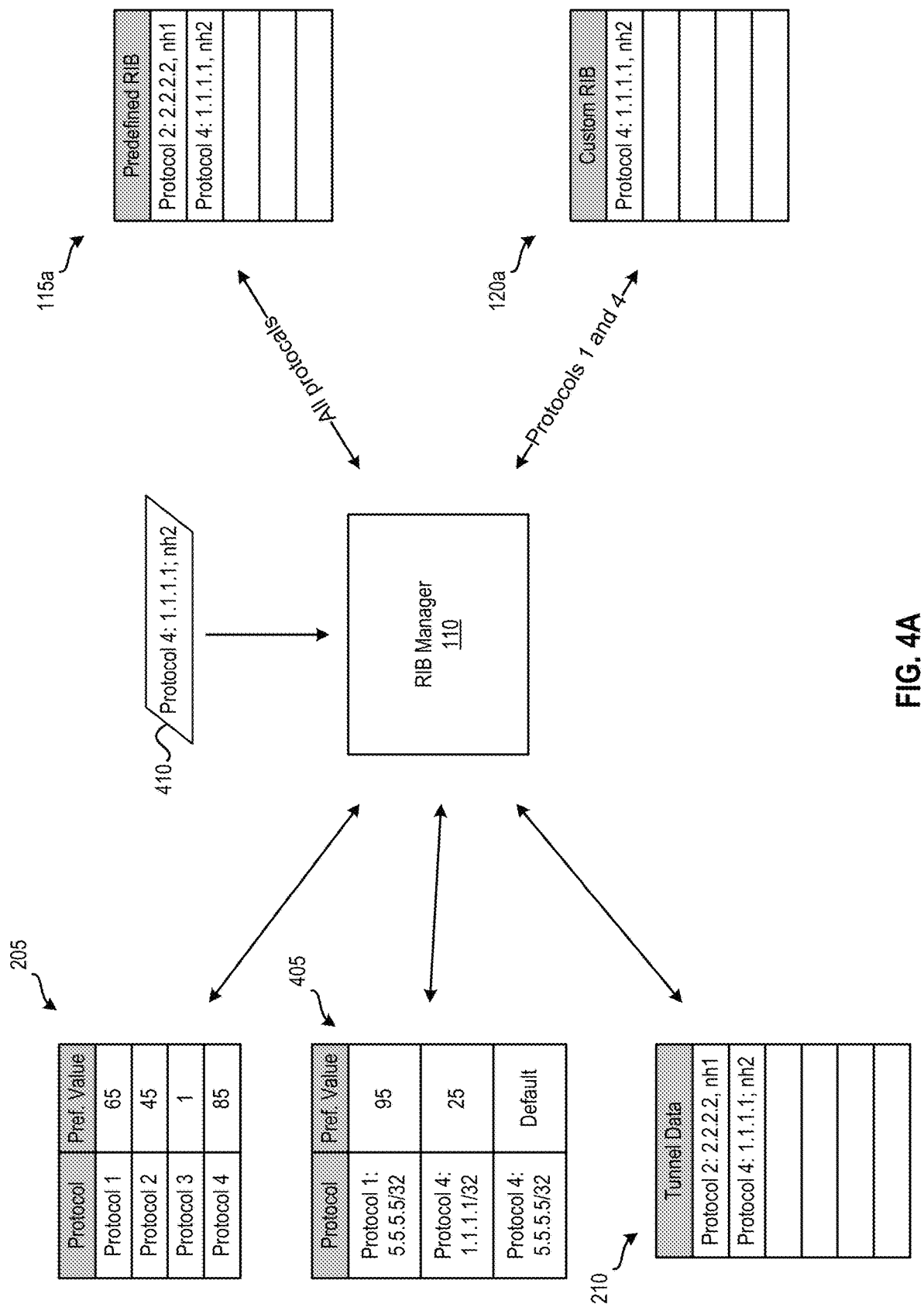
FIGS. 4A-4D illustrate another example of populating a custom RIB based on custom preference values according to some embodiments.

In addition, FIG. 4A illustrates RIB manager 110 receiving tunnel data 410. Here, network device 100 receives tunnel data 410 from another network device (not shown) through routing protocol 4. Tunnel data 410 specifies a tunnel end point with an IPv4 address of 1.1.1.1. Upon receiving tunnel data 410, RIB manager 110 stores it in tunnel data table 210, as depicted in FIG. 4A. Then, RIB manager 110 determines whether tunnel data table 210 has any other entries with the same tunnel end point of 1.1.1.1. Here, there are none so RIB manager 110 determines the next hop, represented by nh2 in this example, to which data is forwarded in order to reach the tunnel end point 1.1.1.1 and populates predefined RIB 115a with the tunnel end point 1.1.1.1 and the next hop nh2. As explained above, custom RIB 120a is configured to be populated by tunnel data from routing protocol 4. In this example, RIB manager 110 accesses custom preference table 405 to determine whether a tunnel endpoint of 1.1.1.1 from routing protocol 4 is allowed to be used to populate custom RIB 120a. As shown in FIG. 4A, custom preference table 405 includes an entry that specifies an IPv4 address of 1.1.1.1 for routing protocol 4. Therefore, RIB manager 110 also populates custom RIB 120a with the tunnel end point 1.1.1.1 and the next hop nh2.

Figure 4B:
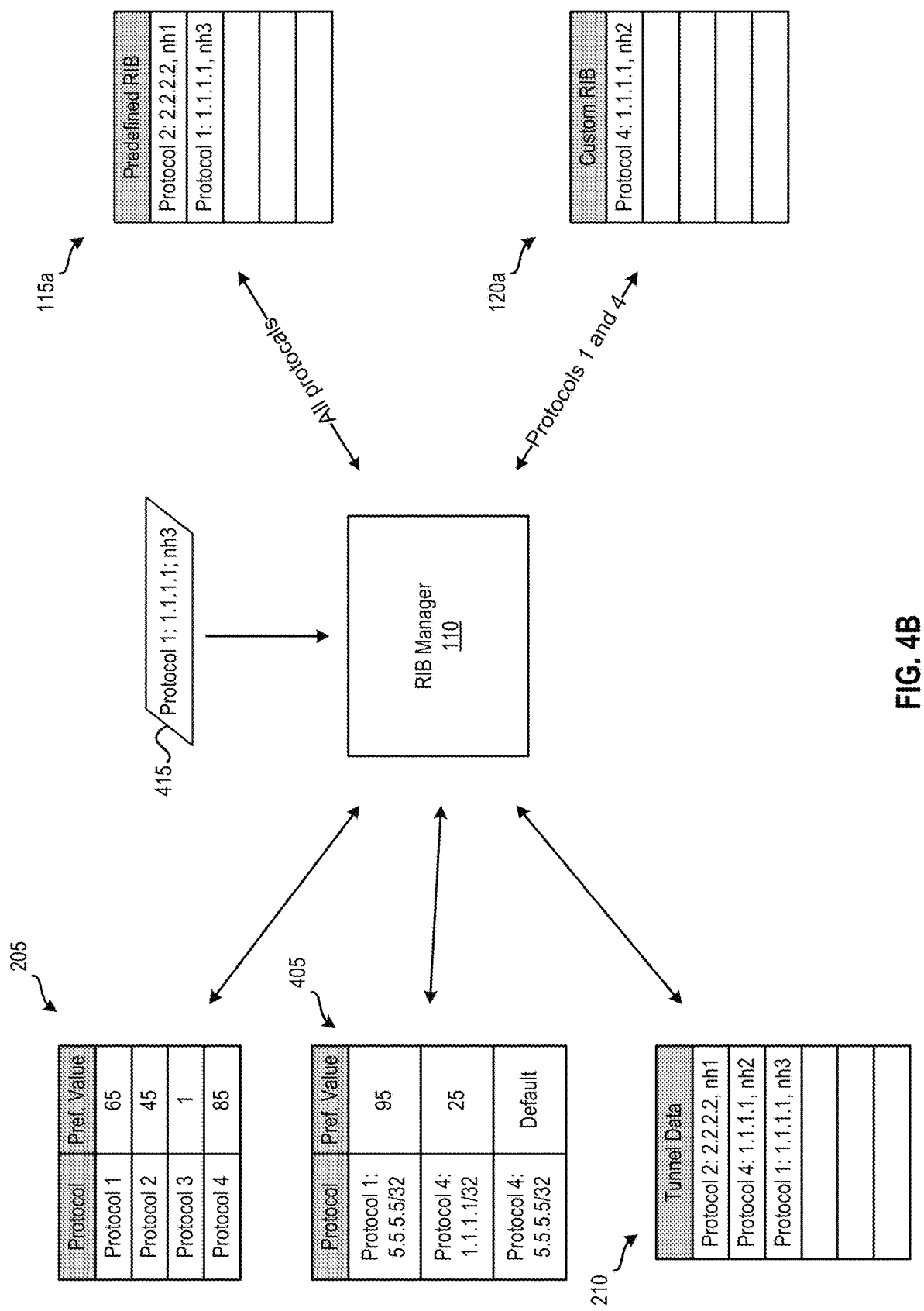

FIG. 4B illustrates RIB manager 110 receiving tunnel data 415 from routing protocol 1. In this example, network device 100 receives tunnel data 415 from another network device (not shown) through routing protocol 1. Tunnel data 415 specifies a tunnel end point with an IPv4 address of 1.1.1.1. Once RIB manager 110 receives tunnel data 415, RIB manager 110 stores it in tunnel data table 210. Next, RIB manager 110 determines whether tunnel data table 210 has any other entries with the same tunnel end point of 1.1.1.1. For this example, RIB manager 110 determines that tunnel data table 210 has another entry with the same tunnel end point that was received from routing protocol 4. Accordingly, RIB manager 110 accesses preference table 205 to identify the preference values for routing protocols 1 and 4 to use for predefined RIB 115a. Here, routing protocol 1 has a lower preference value than routing protocol 4 and, therefore, routing protocol 1 has a higher preference. Thus, RIB manager 110 determines the next hop, represented by nh3 in this example, to which data is forwarded in order to reach the tunnel end point 1.1.1.1 and replaces the entry containing tunnel data 410 with tunnel data determined from tunnel data 415. Because custom RIB 120a is configured to be populated by tunnel data from routing protocol 1, RIB manager 110 accesses custom preference table 405 to determine whether a tunnel endpoint of 1.1.1.1 from routing protocol 1 is allowed to be used to populate custom RIB 120a. Here, custom preference table 405 does not include an entry that specifies an IPv4 address of 1.1.1.1 for routing protocol 1. Thus, RIB manager 110 determines that the tunnel endpoint of 1.1.1.1 from routing protocol 1 is not allowed to be used to populate custom RIB 120a, which remains unchanged.

Figure 4C:
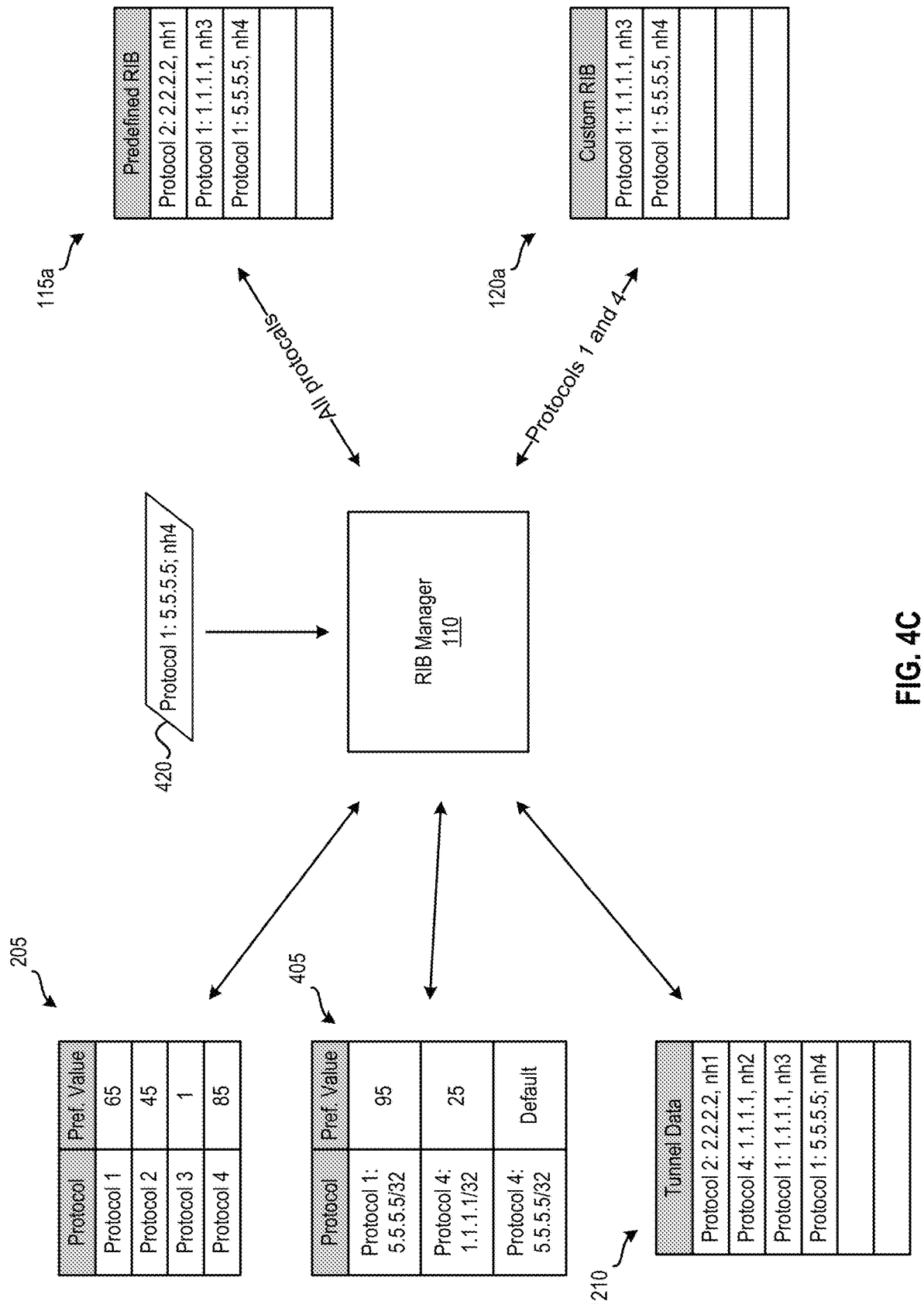

FIG. 4C illustrates RIB manager 110 receiving tunnel data 420 from routing protocol 1. Here, network device 100 receives tunnel data 420 from another network device (not shown) through routing protocol 1. Tunnel data 420 specifies a tunnel end point with an IPv4 address of 5.5.55. After receiving tunnel data 420, RIB manager 110 stores it in tunnel data table 210. RIB manager 110 then determines whether tunnel data table 210 has any other entries with the same tunnel end point of 5.5.5.5. In this example, there are not any so RIB manager 110 determines the next hop, represented by nh4 in this example, to which data is forwarded in order to reach the tunnel end point 5.5.5.5 and populates predefined RIB 115a with the tunnel end point 5.5.5.5 and the next hop nh4. As mentioned above, custom RIB 120a is configured to be populated by tunnel data from routing protocol 1. Thus, RIB manager 110 accesses custom preference table 405 to determine whether a tunnel endpoint of 5.5.5.5 from routing protocol 1 is allowed to be used to populate custom RIB 120a. As depicted in FIG. 4C, custom preference table 405 includes an entry that specifies an IPv4 address of 5.5.5.5 for routing protocol 1. RIB manager 110 determines that the tunnel endpoint of 5.5.5.5 from routing protocol 1 is allowed to be used to populate custom RIB 120a. Therefore, RIB manager 110 populates custom RIB 120a with the tunnel end point 5.5.5.5 and the next hop nh4.

Figure 4D:
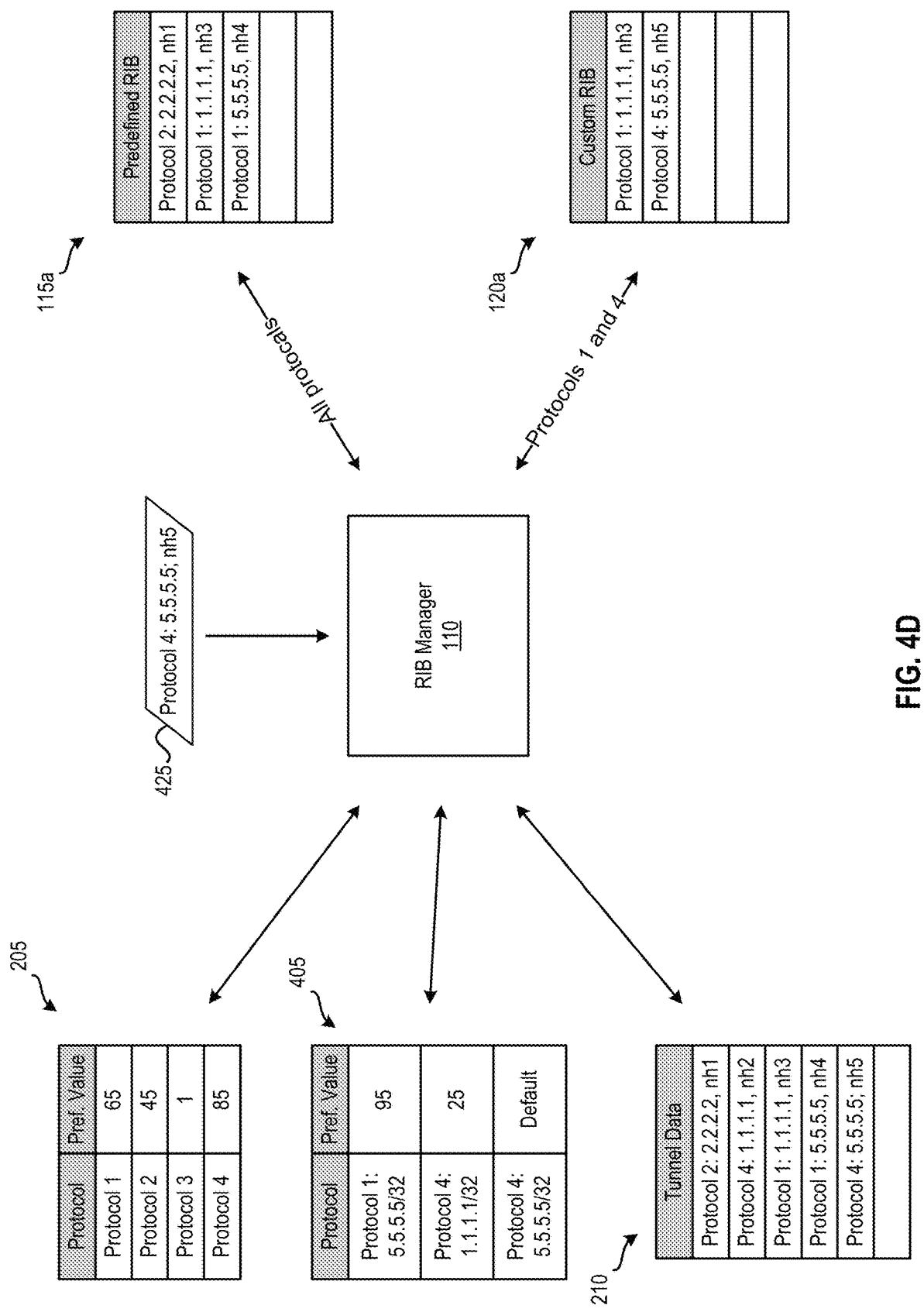

FIG. 4D illustrates RIB manager 110 receiving tunnel data 425 from routing protocol 4. For this example, network device 100 receives tunnel data 425 from another network device (not shown) through routing protocol 4. Tunnel data 425 specifies a tunnel end point with an IPv4 address of 5.5.5.5. Upon receiving tunnel data 425, RIB manager 110 stores it in tunnel data table 210. Then, RIB manager 110 determines whether tunnel data table 210 has any other entries with the same tunnel end point of 5.5.5.5. Here, RIB manager 110 determines that tunnel data table 210 has another entry with the same tunnel end point that was received from routing protocol 1. Therefore, RIB manager 110 accesses preference table 205 to identify the preference values for routing protocols 1 and 4 to use for predefined RIB 115a. Because routing protocol 1 has a lower preference value than routing protocol 4, routing protocol 1 has a higher preference. As such, RIB manager 110 leaves the entry in predefined RIB 115a containing tunnel data 420. As explained above, custom RIB 120a is configured to be populated by tunnel data from routing protocol 4. RIB manager 110 then accesses custom preference table 405 to determine whether a tunnel endpoint of 5.5.5.5 from routing protocol 4 is allowed to be used to populate custom RIB 120a. In this example, custom preference table 405 includes an entry that specifies an IPv4 address of 5.5.5.5 for routing protocol 4. In this example, tunnel data table 210 has another entry with the same tunnel end point that was received from routing protocol 4 so RIB manager 110 accesses custom preference table 405 to identify the preference values for IPv4 address 5.5.5.5 for routing protocols 1 and 4 to use for custom RIB 120a. As shown, the preference value for IPv4 address 5.5.5.5 for routing protocol 1 is 95. Because the preference value stored in custom preference table 305 for IPv4 address 5.5.5.5 for routing protocol 4 is "default," RIB manager 110 accesses preference table 205 to identify the preference value of 85 for routing protocol 4. For this example, IPv4 address 5.5.5.5 for routing protocol 4 has a lower preference value than IPv4 address 5.5.5.5 for routing protocol 1 and, thus, IPv4 address 5.5.5.5 for routing protocol 4 has a higher preference. Then, RIB manager 110 determines the next hop, represented by nh5 in this example, to which data is forwarded in order to reach the tunnel end point 5.5.5.5 and replaces the entry containing tunnel data 420 with tunnel data determined from tunnel data 425.

3. Examples of Resolving Routing Protocol Paths

The following section describes examples of resolving routing protocol paths using different RIBs. Examples of a routing protocol path include a BGP unicast path (e.g., an IPv4 unicast path, an IPv6 unicast path, etc.) that network device 100 receives from another network device through a BGP routing protocol. A routing protocol path may specify an IP address (e.g., an IPv4 address, an IPv6 address, etc.).

Figure 5A:
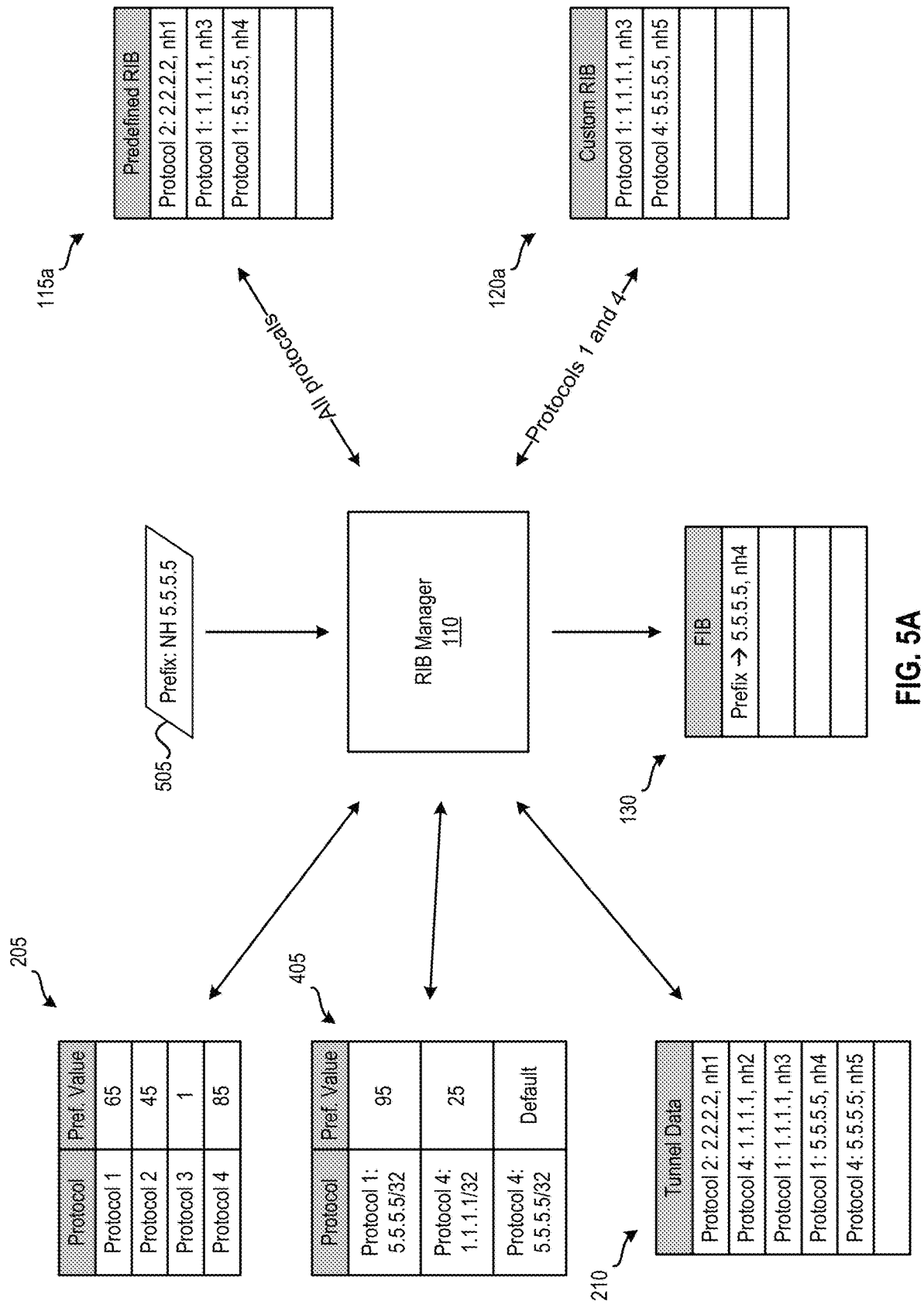
FIGS. 5A and 5B illustrate an example of resolving a routing protocol path according to some embodiments.

Referring now to FIG. 5A, FIG. 5A illustrates an example of resolving a routing protocol path using a predefined RIB according to some embodiments. Specifically, FIG. 5A shows an example of resolving a BGP path 505 using predefined RIB 115a shown in FIG. 4D. BGP path 505 specifies an IPv4 next hop address of 5.5.5.5. When network device 110 receives BGP path 505 from another network device (not shown) through a BGP routing protocol, RIB manager 110 performs a lookup on predefined RIB 115a to determine whether an entry exists in predefined RIB 115a that matches the IPv4 next hop address of 5.5.5.5. Here, the third entry in predefined RIB 115a matches 5.5.5.5. As such, RIB manager 110 determines a next hop (nh4 in this example) for BGP path 505 based on the entry and populates FIB 130 with the IP next hop address and next hop mapping, as shown in FIG. 5A.

Figure 5B:
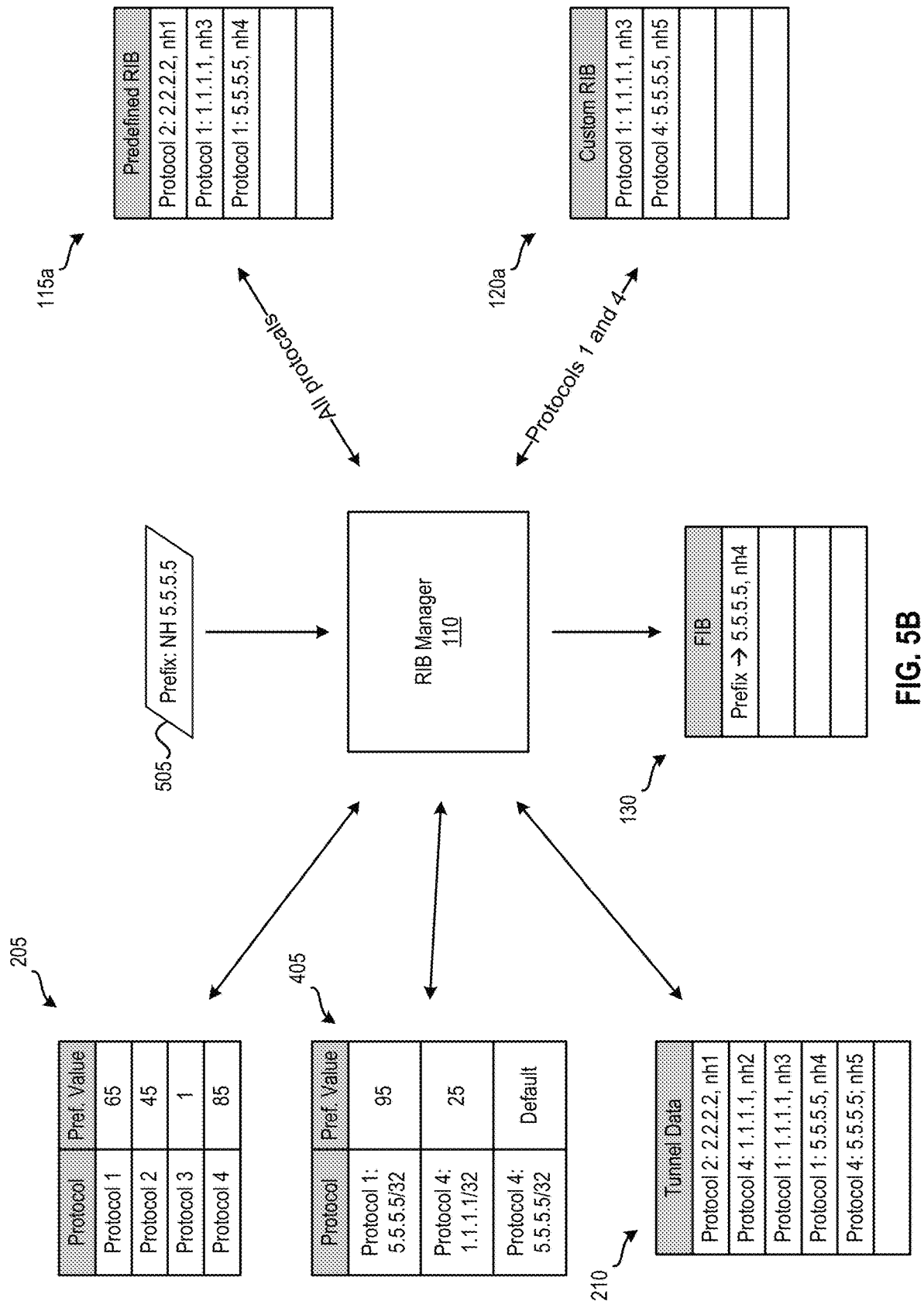

FIG. 5B illustrates an example of resolving a routing protocol path using a custom RIB according to some embodiments. In particular, FIG. 5B depicts an example of resolving BGP path 505 using custom RIB 120a illustrated in FIG. 4D. Upon receiving BGP path 505 from another network device (not shown) through a BGP routing protocol, RIB manager 110 performs a lookup on custom RIB 120a to determine whether an entry exists in custom RIB 120a that matches the IPv4 next hop address of 5.5.5.5. In this example, the second entry in custom RIB 120a matches 5.5.5.5. Therefore, RIB manager 110 determines a next hop (nh5 in this example) for BGP path 505 based on the entry and populates FIB 130 with the IP next hop address and next hop mapping, as depicted in FIG. 5B.

4. Examples of Next Hop Resolution Configurations

The previous section described examples of resolving routing protocol paths using different RIBs. In some cases, a routing protocol path cannot be resolved using a particular RIB because the particular RIB does not include an entry that matches the routing protocol path. In some embodiments, a user of network device 100 can create a resolution configuration that specifies a primary routing table and a secondary routing table. RIB manager 110 uses the primary routing table to resolve a particular protocol path. If RIB manager 110 is unable to resolve the particular routing protocol path using the primary routing table, RIB manager 110 then uses the secondary routing table to try to resolve the particular routing protocol path.

FIGS. 6A and 6B illustrate examples of next hop resolution configurations according to some embodiments. Specifically, FIG. 6A illustrates an example of a next hop resolution configuration 600 where custom RIB 120a is specified as a primary routing table and predefined RIB 115b is specified as a secondary routing table. In this example, custom RIB 120a is a tunnel RIB that includes network tunnel data similar to the ones shown in FIGS. 2C, 2D, 3A, 3B, 4A-4D, 5A, and 5B. Predefined RIB 115b is a unicast RIB that includes unicast route data (e.g., destination IPv4 addresses and associated next hops, destination IPv6 addresses and associated next hops, etc.). When RIB manager 110 receives a particular routing protocol path (e.g., BGP path 505 with an IPv4 next hop address of 5.5.5.5) and next hop resolution configuration 600 is being used, RIB manager 110 uses custom RIB 120a to try to resolve the particular routing protocol path. If RIB manager 110 is unable to resolve the particular routing protocol path using custom RIB 120a, RIB manager 110 then uses predefined RIB 115a to try to resolve the particular routing protocol path.

FIG. 6B illustrates an example of a next hop resolution configuration 605 where predefined RIB 115b is specified as a primary routing table and custom RIB 120a is specified as a secondary routing table. For this example, predefined RIB 115b and custom RIB 120a are the same as the ones shown in FIG. 6A. That is, predefined RIB 115b is a unicast RIB that includes unicast route data and custom RIB 120a is a tunnel RIB that includes network tunnel data. If RIB manager 110 is using next hop resolution configuration 605 when RIB manager 110 receives a particular routing protocol path (e.g., BGP path 505 with an IPv4 next hop address of 5.5.5.5), RIB manager 110 uses predefined RIB 115b to try to resolve the particular routing protocol path. In the event that RIB manager 110 cannot resolve the particular routing protocol path using predefined RIB 115b, RIB manager 110 then uses custom RIB 120a to try to resolve the particular routing protocol path.

The examples described above illustrate how a particular next hop resolution configuration can be used to resolve any received routing protocol paths. In some embodiments, a user of network device 100 can create different resolution configurations for different routing protocol address families. For example, in some embodiments, a BGP routing protocol can have an IPv4 unicast address family, an IPv6 unicast address family, an IPv4 virtual private network (VPN) address family, an IPv6 VPN address family, a layer 2 (L2) Ethernet VPN (EVPN) address family, a layer 3 (L3) EVPN address family, etc. In some such embodiments, a BGP routing protocol path specifies a particular address family with which the routing protocol path is associated.

Figure 7A:
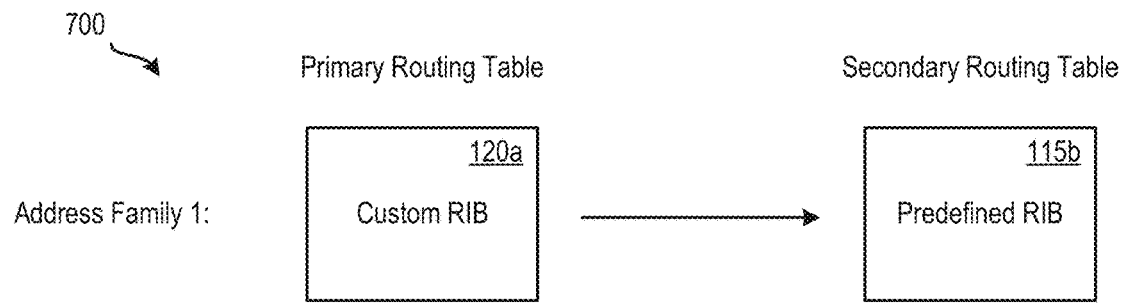
FIGS. 7A-7C illustrate examples of next hop resolution configurations for address families according to some embodiments.
Figure 7B:
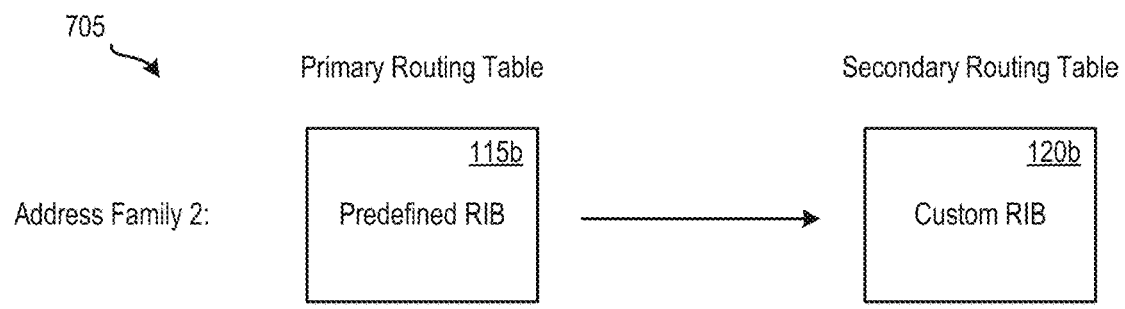
Figure 7C:
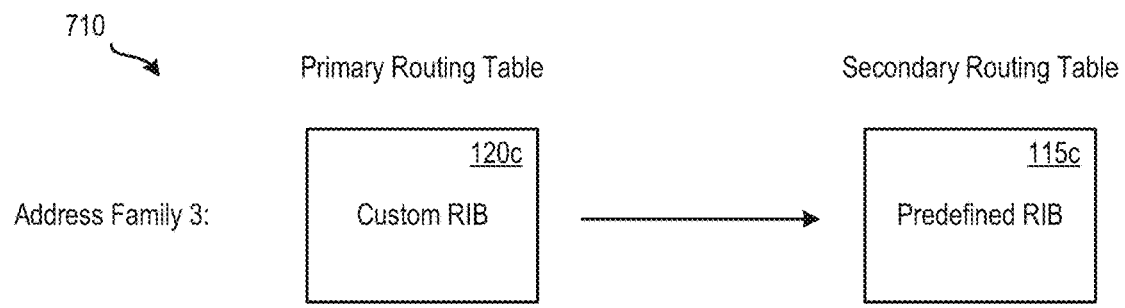

FIGS. 7A-7C illustrate examples of next hop resolution configurations for address families according to some embodiments. In particular, FIG. 7A illustrates an example of a next hop resolution configuration 700 configured for a first address family. As shown, next hop resolution configuration 700 specifies custom RIB 120a as a primary routing table and predefined RIB 115b as a secondary routing table. Here, predefined RIB 115b and custom RIB 120a are the same as the ones shown in FIGS. 6A and 6B. For this example, when RIB manager 110 receives a particular routing protocol path that specifies an address family that matches the first address family, RIB manager 110 uses next hop resolution configuration 700 to resolve the particular routing protocol path. Here, RIB manager 110 uses custom RIB 120a to try to resolve the particular routing protocol path. In cases where RIB manager 110 is unable to resolve the particular routing protocol path using custom RIB 120a, RIB manager 110 then uses predefined RIB 115a to try to resolve the particular routing protocol path.

FIG. 7B illustrates an example of a next hop resolution configuration 705 configured for a second address family. As depicted in FIG. 7B, next hop resolution configuration 705 specifies predefined RIB 115b as a primary routing table and custom RIB 120b as a secondary routing table. In this example, predefined RIB 115b is the same as the one shown in FIGS. 6A and 6B (i.e., a unicast RIB that includes unicast route data) and custom RIB 120b is a custom tunnel RIB configured to store network tunnel data and created using any of the techniques described above. In this example, if RIB manager 110 receives a particular routing protocol path that specifies an address family that matches the second address family, RIB manager 110 uses next hop resolution configuration 705 to resolve the particular routing protocol path. In such instances, RIB manager 110 uses predefined RIB 115b to try to resolve the particular routing protocol path. When RIB manager 110 cannot resolve the particular routing protocol path using predefined RIB 115b, RIB manager 110 then uses custom RIB 120b to try to resolve the particular routing protocol path.

FIG. 7C illustrates an example of a next hop resolution configuration 710 configured for a third address family. As illustrated, next hop resolution configuration 710 specifies custom RIB 120c as a primary routing table and predefined RIB 115c as a secondary routing table. Here, custom RIB 120c is a custom tunnel RIB configured to store network tunnel data and created using any of the techniques described above. Predefined RIB 115c is configured to store unicast route data about neighboring network devices connected to network device 100. When RIB manager 110 receives a particular routing protocol path that specifies an address family that matches the third address family, RIB manager 110 uses next hop resolution configuration 710 to resolve the particular routing protocol path. Specifically, RIB manager 110 uses custom RIB 120c to try to resolve the particular routing protocol path. In instances where RIB manager 110 is unable to resolve the particular routing protocol path using custom RIB 120c, RIB manager 110 then uses predefined RIB 115c to try to resolve the particular routing protocol path.

FIGS. 7A-7C illustrate an example where different next hop resolution configurations can be created and specified for different address families. In some embodiments, network device 100 allows a user to create next hop resolution configurations on a more granular level. For example, for a given address family, a user of network device 100 can create different next hop resolution configurations for different IP addresses (e.g., IPv4 addresses, IPv6 addresses). For instance, a user can create a first next hop resolution configuration and specify that it be used to resolve a routing protocol path with a first IP address in a particular address family, create a second next hop resolution configuration and specify that it be used to resolve a routing protocol path with a second IP address in the particular address family, create a third next hop resolution configuration and specify that it be used to resolve a routing protocol path with a third IP address in the particular address family, etc. Different criteria may be used instead of IP address. Example of such criteria can be the peer network device from which the routing protocol path is received, an autonomous system from which the routing protocol path is received, etc.

5. Example Processes

Figure 8:
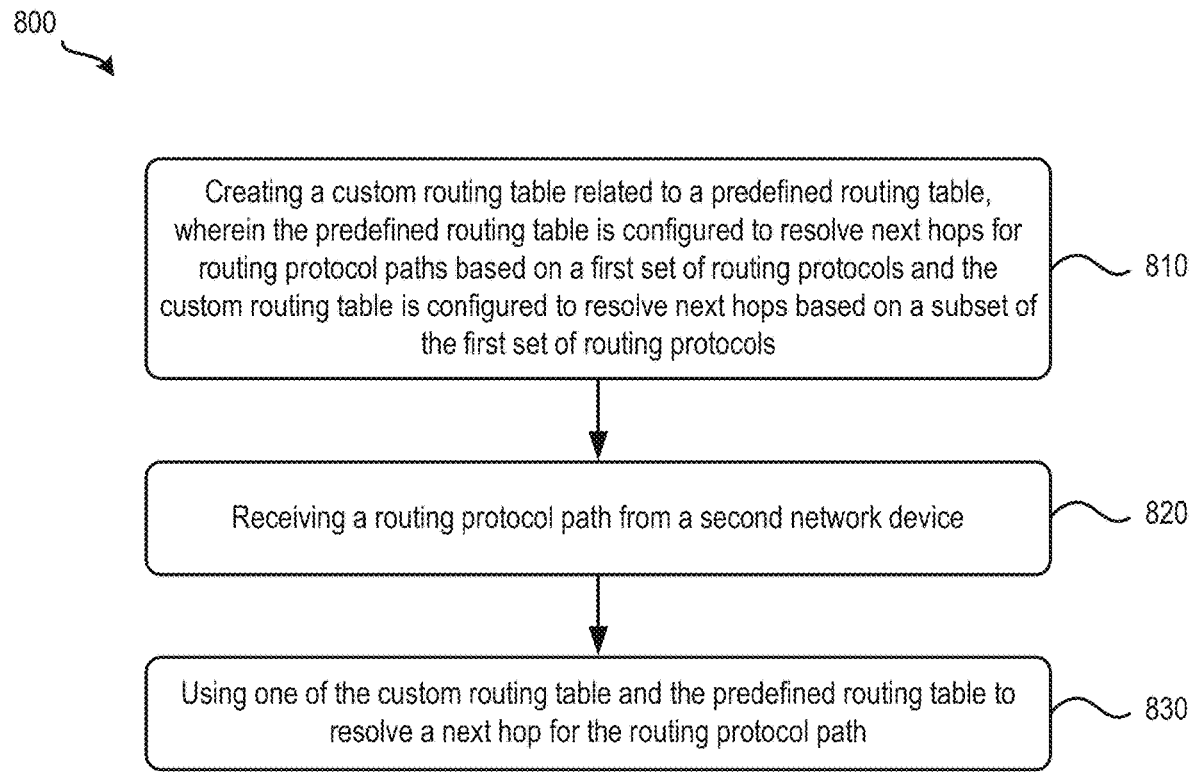
FIG. 8 illustrates a process for creating a custom RIB according to some embodiments.

FIG. 8 illustrates a process 800 for creating a custom RIB according to some embodiments. In some embodiments, network device 100 performs process 800. Process 800 begins by creating, at 810 a custom routing table related to a predefined routing table. The predefined routing table is configured to resolve next hops for routing protocol paths based on a first set of routing protocols and the custom routing table is configured to resolve next hops based on a subset of the first set of routing protocols. Referring to FIGS. 1 and 2A as an example, network device 100 may create custom RIB 120a. Predefined RIB 115a can be an example of the predefined routing table, which is configured to be populated by tunnel data from any of the routing protocols 1-4. Custom RIB 120a is configured to be populated by tunnel data from routing protocols 1 and 4, which is a subset of routing protocols 1-4.

Next, process 800 receives, at 820, a routing protocol path from a second network device. Referring to FIG. 5A an example, RIB manager 110 receives the protocol path, such as BGP path 505, which includes IPv4 next hop address 5.5.5.5, from another network device through a BGP routing protocol.

Finally, process 800 uses, at 830, one of the custom routing table and the predefined routing table to resolve a next hop for the routing protocol path. Referring to FIG. 5A as an example, when RIB manager 110 receives BGP path 505, RIB manager 110 performs a lookup on predefined RIB 115a to determine whether an entry exists in predefined RIB 115a that matches the IPv4 next hop address of 5.5.5.5. The third entry in predefined RIB 115a matches 5.5.5.5 so RIB manager 110 determines a next hop (nh4 in this example) for BGP path 505 based on the entry and populates FIB 130 with the IP next hop address and next hop mapping. Referring to FIG. 5B as another example, when RIB manager 110 receives BGP path 505, RIB manager 110 performs a lookup on custom RIB 120a to determine whether an entry exists in custom RIB 120a that matches the IPv4 next hop address of 5.5.5.5. Here, the second entry in custom RIB 120a matches 5.5.5.5 and, thus, RIB manager 110 determines a next hop (nh5 in this example) for BGP path 505 based on the entry and populates FIB 130 with the IP next hop address and next hop mapping.

Figure 9:
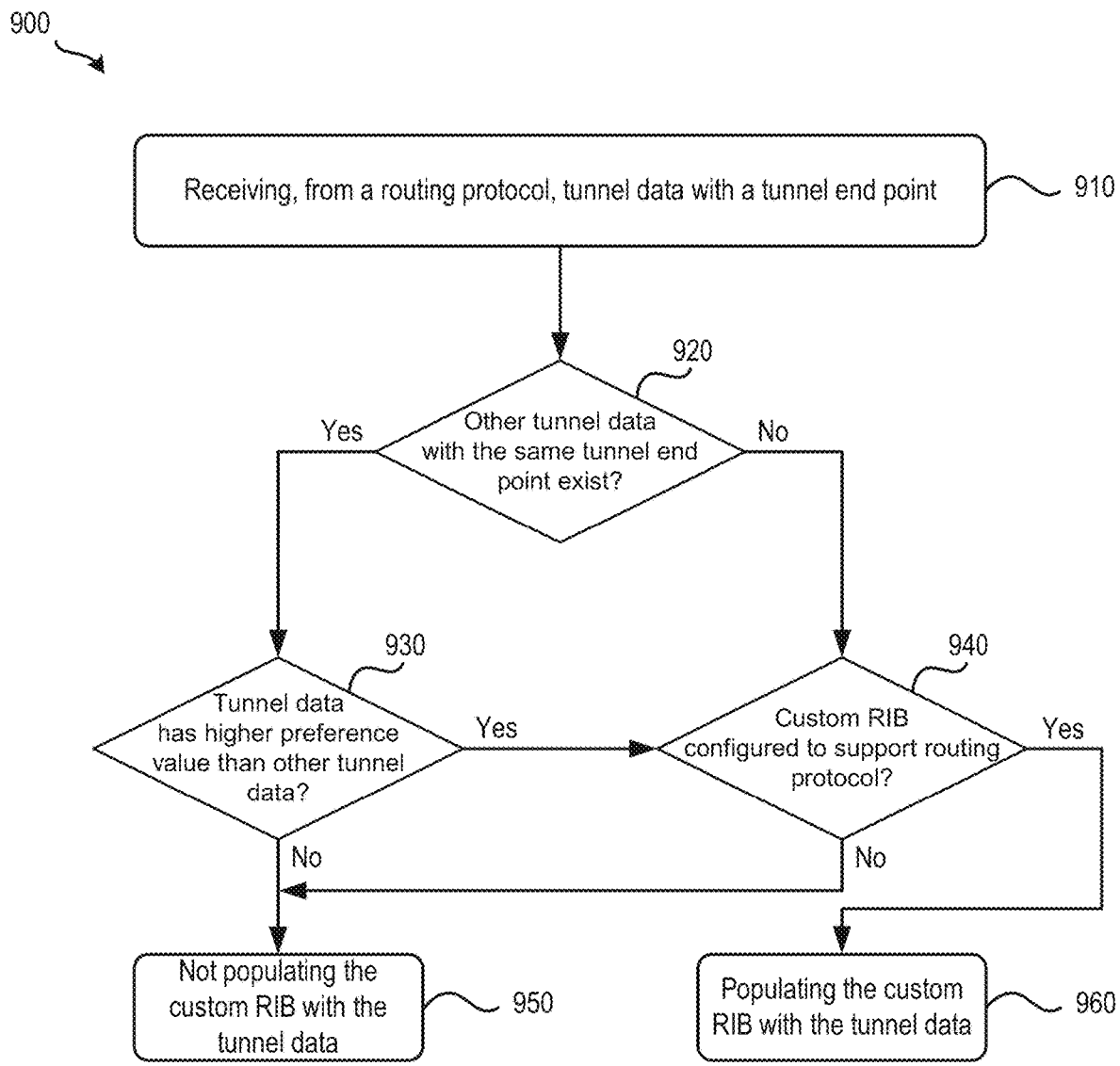
FIG. 9 illustrates a process for populating a custom RIB with tunnel data according to some embodiments.

FIG. 9 illustrates a process 900 for populating a custom RIB with tunnel data according to some embodiments. In some embodiments, network device 100 performs process 900. Process 900 starts by receiving, at 910, from a routing protocol, tunnel data with a tunnel end point. Referring to FIG. 3B as an example, network device 100 may receive tunnel data 315 from routing protocol 1 that has a tunnel end point of 1.1.1.1.

Next, process 900 determines, at 920, whether other tunnel data with the same tunnel end point exists. If so, process 900 continues to operation 930. Otherwise, process 900 proceeds to operation 940. Continuing with the example above, RIB manager 110 can determine whether tunnel data 210 contains any other tunnel data with the same tunnel end point of 1.1.1.1. In this example, RIB manager 110 determines that tunnel data table 210 has another entry with the same tunnel end point that was received from routing protocol 4. Thus, process 900 continues to operation 930 for this example.

At 930, process 900 determines whether the tunnel data has a higher preference value than the other tunnel data. If process 900 determines that the tunnel data has a higher preference value than the other tunnel data, process 900 continues to operation 940. For instance, if custom preference table 305 in FIG. 3B had a higher preference value for routing protocol 1 than the preference value for routing protocol 4, process 900 would continue to operation 940. If process 900 determines that the tunnel data does not have a higher preference value than the other tunnel data, then process 900 does not populate, at 950, the custom RIB with the tunnel data. In the example illustrated in FIG. 3B, tunnel data 315 has a lower preference value and, thus, process 900 does not populate custom RIB 120*a* with tunnel data 315.

At 940, process 900 determines whether the custom RIB is configured to support the routing protocol. If so, process 900 populates, at 960, the custom RIB with the tunnel data. For example, in the example mentioned above where custom preference table 305 had a higher preference value for routing protocol 1 than the preference value for routing protocol 4, process 900 would populate custom RIB 120*a* with tunnel data 315 (e.g., by replacing the tunnel data with end point 1.1.1.1 from routing protocol 4) because custom RIB 120*a* is configured to support routing protocol 1. If process 900 determines that the custom RIB is not configured to support the routing protocol, process 900 does not populate, at 950, the custom RIB with the tunnel data. Using the example above where custom preference table 305 had a higher preference value for routing protocol 1 than the preference value for routing protocol 4 except custom RIB 120*a* does not support routing protocol 1, process 900 would not populate tunnel data 315 in custom RIB 120*a* and the tunnel data with the end point of 1.1.1.1 from routing protocol 4 would remain in custom RIB 120*a*.

6. Further Examples

The following are some example embodiments of the present disclosure. In some embodiments, a method, executable by a first network device, creates a custom routing table related to a predefined routing table. The predefined routing table is configured to resolve next hops for routing protocol paths based on a first set of routing protocols and the custom routing table is configured to resolve next hops based on a subset of the first set of routing protocols. The method further receives a routing protocol path from a second network device. The method also uses one of the custom routing table and the predefined routing table to resolve a next hop for the routing protocol path.

In some embodiments, the custom routing table is further configured to resolve next hops for routing protocol paths for an address family.

In some embodiments, using one of the custom routing table and the predefined routing table to resolve the next hop for the routing protocol path comprises using the custom routing table to resolve the next hop for the routing protocol path when an address family associated with the routing protocol path matches the address family for which the custom routing table is configured to resolve routing protocol paths; and using the predefined routing table to resolve the next hop for the routing protocol path when an address family associated with the routing protocol path does not match the address family for which the custom routing table is configured to resolve routing protocol paths.

In some embodiments, the address family is a unicast address family, a layer 2 virtual private network address family, or a layer 3 virtual private network address family.

In some embodiments, the method may further create a custom next hop resolution configuration. The custom next hop resolution configuration is configured to use the custom routing table to resolve a first routing protocol path that matches a first path and use the predefined routing table to resolve the first routing protocol path when the custom routing table is unable to resolve the first routing protocol path. The custom next hop resolution configuration is further configured to use the predefined routing table to resolve a second routing protocol path that matches the second path and use the custom routing table to resolve the second routing protocol path when the predefined routing table is unable to resolve the second routing protocol path.

In some embodiments, the first routing protocol path comprises a next hop address. Resolving the first routing protocol path comprises determining a next hop based on the next hop address of the first routing protocol path and populating a forwarding table with a mapping between the next hop address and the next hop.

In some embodiments, the forwarding table is included in a data plane of the first network device.

In some embodiments, the method further receives a route from a routing protocol; upon determining that the routing protocol is one of the routing protocols in the subset of the set of routing protocols, determines whether to populate the custom routing table with the route; and, upon determining that the routing protocol is not one of the routing protocols in the subset of the set of routing protocols, not populating the custom routing table with the route.

In some embodiments, the route is a first route comprising a first tunnel end point. Determining whether to populate the custom routing table with the route comprises, upon determining that a second route comprising the a second tunnel end point that matches the first tunnel end point exists, determining whether a first preference value associated with the first route is higher than a second preference value associated with the second route; upon determining that the first preference value associated with the first route is higher than the second preference value associated with the second route, populating the first route in the custom routing table; and upon determining that the first preference value associated with the first route is not higher than the second preference value associated with the second route, not populating the first route in the custom routing table.

In some embodiments, the routing protocol path is a border gateway protocol path.

In some embodiments, first network device comprising a processor; and a non-transitory machine-readable medium storing instructions. The instructions cause the processor to create a custom routing table related to a predefined routing table. The predefined routing table is configured to resolve next hops for routing protocol paths based on a first set of routing protocols and the custom routing table is configured to resolve next hops based on a subset of the first set of routing protocols. The instructions further cause the processor to receive a routing protocol path from a second network device. The instructions also cause the processor to use one of the custom routing table and the predefined routing table to resolve a next hop for the routing protocol path.

In some embodiments, the instructions further cause the processor to create a custom next hop resolution configuration. The custom next hop resolution configuration is configured to use the custom routing table to resolve a particular routing protocol path and use the predefined routing table to resolve the particular routing protocol path when the custom routing table is unable to resolve the particular routing protocol path.

In some embodiments, resolving the particular routing protocol path comprises performing a lookup in the custom routing table based on the particular routing protocol path and, based on the lookup, determining a next hop for the routing protocol path.

In some embodiments, the predefined routing table is a unicast routing information base (RIB) included in a control plane of the first network device.

In some embodiments, the instructions further cause the processor to create a custom next hop resolution configuration. The custom next hop resolution configuration is configured to use the predefined routing table to resolve a particular routing protocol path, and use the custom routing table to resolve the particular routing protocol path when the predefined routing table is unable to resolve the particular routing protocol path.

In some embodiments, the instructions further cause the processor to receive, through a first protocol in the subset of the set of routing protocols, a first route having a first route address; receive, through a second protocol in the subset of the set of routing protocols, a second route having a second route address, wherein the first route address and the second route address are the same; and based on a first preference value specified for the first protocol and a second preference value specified for the second protocol, select one of the first and second routes to populate in the custom routing table.

In some embodiments, the set of routing protocols used by the predefined routing table of the first network device to determine next hops for routing protocol paths comprises a set of tunneling protocols.

In some embodiments, the custom routing table and the predefined routing table are routing information bases (RIBs) included in a control plane of the first network device.

In some embodiments, the instructions further cause the processor to create a route processing configuration for the custom routing table. The route processing configuration is configured to populate the custom routing table with routes received through a routing protocol in the subset of the set of routing protocols having addresses that are included in a set of route addresses, and drop routes received through the routing protocol in the subset of the set of routing protocols having addresses that are not included in the set of route addresses.

In some embodiments, the route processing configuration is further configured to use a first preference value for a first route received through the routing protocol having a first route address that is not the same as a particular route address in the set of route addresses and use a second preference value for a second route received through the routing protocol having a second route address that is the same as the particular route address in the set of route addresses.

7. Example Network Device

Figure 10:
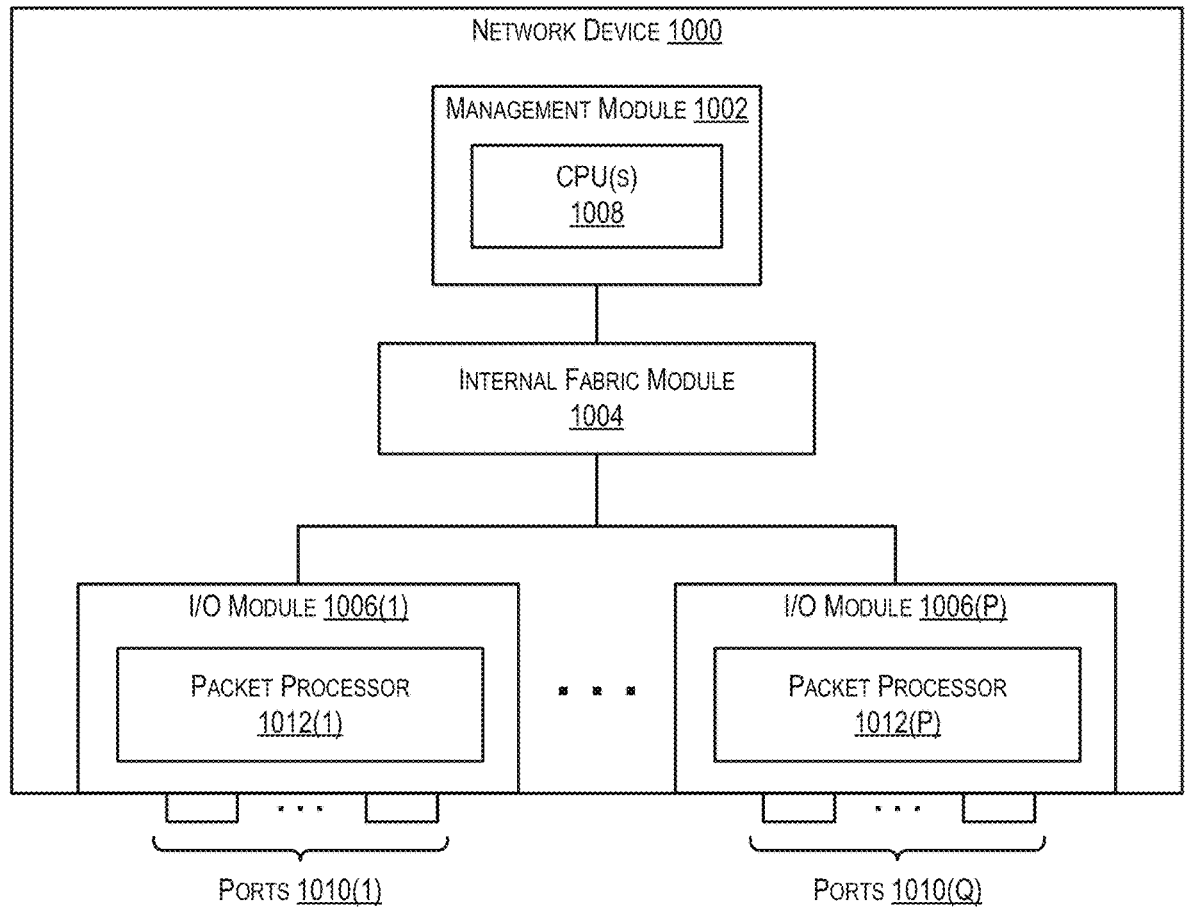
FIG. 10 illustrates an example network device according to certain embodiments.

FIG. 10 depicts an example network device (e.g., a network switch and/or router) 1000 that may be used to implement a hardware-based version of network device 100 of FIG. 1 in certain embodiments—in other words, a version of network device 100 that is implemented, at least in part, via one or more ASICs and/or other hardware processing elements.

As shown, network device 1000 includes a management module 1002, an internal fabric module 1004, and a number of I/O modules 1006(1)-1006(P). Management module 1002 includes one or more management CPUs 1008 for managing/controlling the operation of the device. Each management CPU 1008 can be a general purpose processor, such as an Intel/AMD x86 or ARM-based processor, that operates under the control of software stored in an associated memory (not shown).

Internal fabric module 1004 and I/O modules 1006(1)-1006(P) collectively represent the data, or forwarding, plane of network device 1000. Internal fabric module 1004 is configured to interconnect the various other modules of network device 1000. Each I/O module 1006(1)-1006(P) includes one or more input/output ports 1010(1)-1010(Q) that are used by network device 1000 to send and receive network packets. Each I/O module 1006(1)-1006(P) can also include a packet processor 1012(1)-1012(P). Packet processor 1012(1)-1012(P) is a hardware processing component (e.g., an ASIC) that can make wire speed decisions on how to handle incoming or outgoing network packets. In certain embodiments, one or more of the techniques described in the present disclosure may be implemented wholly, or in part, within packet processors 1012(1)-1012(P).

It should be appreciated that network device 1000 is illustrative and many other configurations having more or fewer components than network device 1000 are possible.

8. Example Computer System

Figure 11:
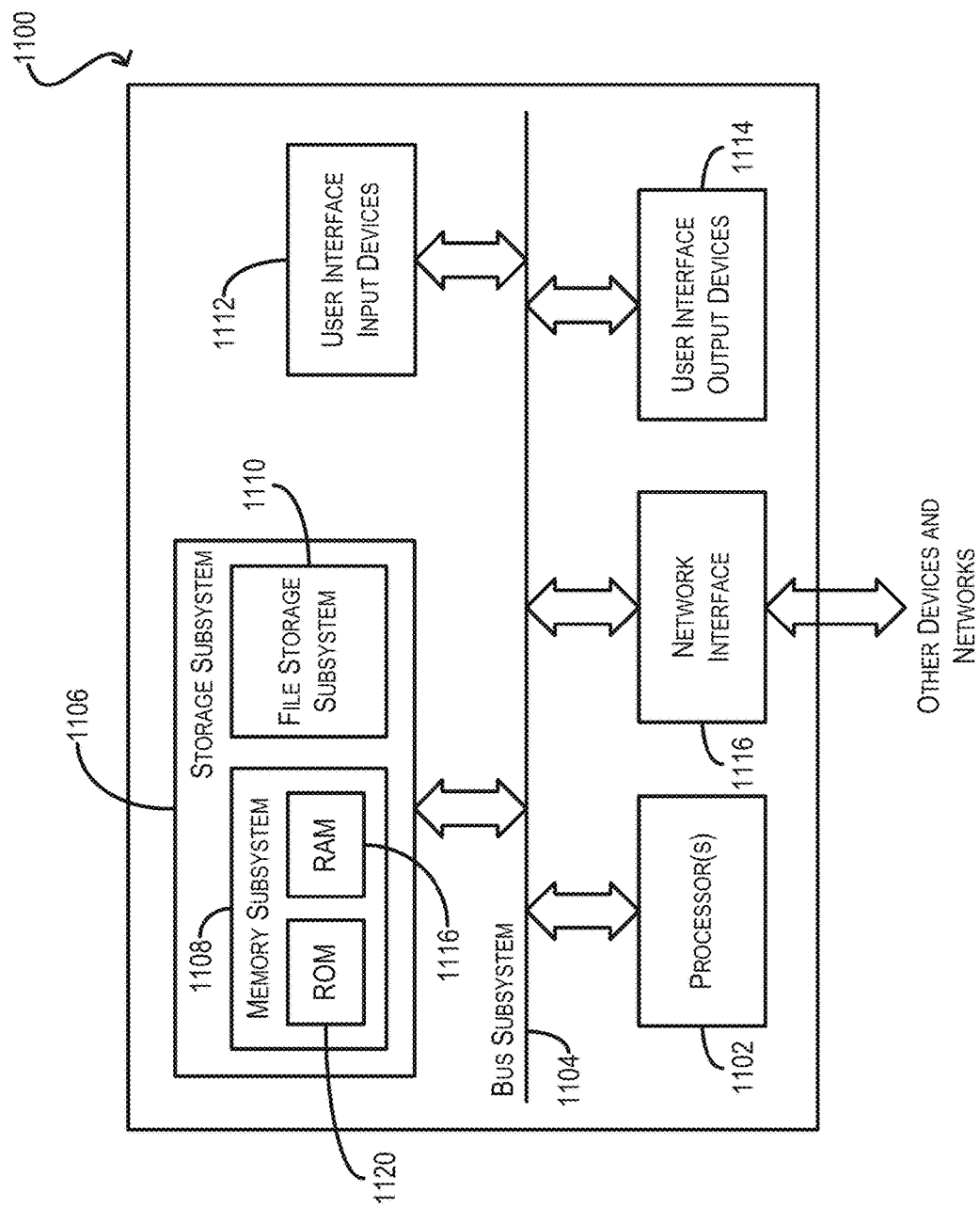
FIG. 11 illustrates an example computer system according to some embodiments.

FIG. 11 depicts an example computer system 1100 according to some embodiments. Computer system 1100 can be used to implement any of the computing devices, systems, servers, network elements, etc., described in the foregoing disclosure. As shown in FIG. 11, computer system 1100 includes one or more processors 1102 that communicate with a number of peripheral devices via a bus subsystem 1104. These peripheral devices include a storage subsystem 1106 (comprising a memory subsystem 1108 and a file storage subsystem 1110), user interface input devices 1112, user interface output devices 1114, and a network interface subsystem 1116.

Bus subsystem 1104 can provide a mechanism for letting the various components and subsystems of computer system 1100 communicate with each other as intended. Although bus subsystem 1104 is shown schematically as a single bus, alternative embodiments of the bus subsystem can utilize multiple buses.

Network interface subsystem 1116 can serve as an interface for communicating data between computer system 1100 and other computer systems or networks. Embodiments of network interface subsystem 1116 can include, e.g., an Ethernet card, a Wi-Fi and/or cellular adapter, a modem (telephone, satellite, cable, ISDN, etc.), digital subscriber line (DSL) units, and/or the like.

User interface input devices 1112 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1100.

User interface output devices 1114 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1100.

Storage subsystem 1106 includes a memory subsystem 1108 and a file/disk storage subsystem 1110. Subsystems 1108 and 1110 represent non-transitory computer-readable storage media that can store program code and/or data that provide the functionality of embodiments of the present disclosure.

Memory subsystem 1108 includes a number of memories including a main random access memory (RAM) 1118 for storage of instructions and data during program execution and a read-only memory (ROM) 1120 in which fixed instructions are stored. File storage subsystem 1110 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1100 is illustrative and many other configurations having more or fewer components than system 1100 are possible.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method, executable by a first network device, comprising:
    creating a custom routing table related to a predefined routing table, said custom routing table and said predefined routing table located in a control plane, wherein the custom routing table is user-generated, wherein the predefined routing table is configured to resolve next hops for routing protocol paths based on a first set of routing protocols and the custom routing table is configured to resolve next hops based on a subset of the first set of routing protocols;
    receiving a routing protocol path from a second network device, the routing protocol path comprising a first network address;
    based on a next hop resolution configuration, determining whether to use the custom routing table or the predefined routing table to resolve a next hop for the routing protocol path; and
    based on the determination, using one of the custom routing table and the predefined routing table to resolve the next hop for the routing protocol path comprising:
        determining, from only the customer routing table or only the predefined routing table, an entry having a second network address that matches the first network address of the routing protocol path and
        storing, in a forwarding information base of a data plane of the network device, a mapping between the first network address and a next hop interface specified in the determined entry.

2. The method of claim 1, wherein the custom routing table is further configured to resolve next hops for routing protocol paths for an address family.

3. The method of claim 2, wherein using one of the custom routing table and the predefined routing table to resolve the next hop for the routing protocol path comprises:
    using the custom routing table to resolve the next hop for the routing protocol path when an address family associated with the routing protocol path matches the address family for which the custom routing table is configured to resolve routing protocol paths; and
    using the predefined routing table to resolve the next hop for the routing protocol path when an address family associated with the routing protocol path does not match the address family for which the custom routing table is configured to resolve routing protocol paths.

4. The method of claim 2, wherein the address family is a unicast address family, a layer 2 virtual private network address family, or a layer 3 virtual private network address family.

5. The method of claim 2 further comprising creating a custom next hop resolution configuration,
    wherein the custom next hop resolution configuration is configured to use the custom routing table to resolve a first routing protocol path that matches a first path and use the predefined routing table to resolve the first routing protocol path when the custom routing table is unable to resolve the first routing protocol path,
    wherein the custom next hop resolution configuration is further configured to use the predefined routing table to resolve a second routing protocol path that matches the second path and use the custom routing table to resolve the second routing protocol path when the predefined routing table is unable to resolve the second routing protocol path.

6. The method of claim 5, wherein the first routing protocol path comprises a next hop address, wherein resolving the first routing protocol path comprises:
    determining a next hop based on the next hop address of the first routing protocol path; and
    populating a forwarding table with a mapping between the next hop address and the next hop.

7. The method of claim 6, wherein the forwarding table is included in a data plane of the first network device.

8. The method of claim 1 further comprising:
    receiving a route from a routing protocol;
    upon determining that the routing protocol is one of the routing protocols in the subset of the set of routing protocols, determining whether to populate the custom routing table with the route; and
    upon determining that the routing protocol is not one of the routing protocols in the subset of the set of routing protocols, not populating the custom routing table with the route.

9. The method of claim 1, wherein the routing protocol path is a border gateway protocol path.

10. A method, executable by a first network device, comprising:
    creating a custom routing table related to a predefined routing table, wherein the predefined routing table is configured to resolve next hops for routing protocol paths based on a first set of routing protocols and the custom routing table is configured to resolve next hobs based on a subset of the first set of routing protocols;
    receiving a routing protocol path from a second network device, the routing protocol path comprising a first network address;
    based on a next hop resolution configuration, determining whether to use the custom routing table to resolve the next hop for the routing protocol path comprising:

determining, from only the custom routing table or only the predefined routing table, an entry having a second network address that matches the first network address of the routing protocol path and storing, in a forwarding information base of the network device, a mapping between the first network address and a hop interface specified in the determined entry, receiving a route from a routing protocol;

upon determining that the routing protocol is one of the routing protocols in the subset of the set of routing protocols, determining whether to populate the custom routing table with the route;

upon determining that the routing protocol is not one of the routing protocols in the subset of routing protocols, not populating the custom routing table with the route, wherein the route is a first route comprising a first tunnel end point, wherein determining whether to populate the custom routing table with the route comprises:

upon determining that a second route comprising a second tunnel end point that matches the first tunnel end point exists, determining whether a first preference value associated with the first route is higher than a second preference value associated with the second route;

upon determining that the first preference value associated with the first route is higher than the second preference value associated with the second route, populating the first route in the custom routing table; and upon determining that the first preference value associated with the first route is not higher than the second preference value associated with the second route, not populating the first route in the custom routing table.

11. A first network device comprising:
a processor; and
a non-transitory machine-readable medium storing instructions that when executed by the processor cause the processor to:
create a custom routing table related to a predefined routing table, said custom routing table and said predefined routing table located in a control plane, wherein the custom routing table is user-generated, wherein the predefined routing table is configured to resolve next hops for routing protocol paths based on a first set of routing protocols and the custom routing table is configured to resolve next hops based on a subset of the first set of routing protocols;
receive a routing protocol path from a second network device, the routing protocol path comprising a first network address;
based on a next hop resolution configuration, determine whether to use the custom routing table or the predefined routing table to resolve a next hop for the routing protocol path; and
based on the determination, use on of the custom routing table and the predefined routing table to resolve a next hop for the routing protocol path comprising:
determining, from only the custom routing table or only the predefined routing table, an entry having a second network address that matches the first network address of the routing protocol path and
storing, in a forwarding information base of a data plane of the network device, a mapping between the first network address and a next hop interface specified in the determined entry.

12. The first network device of claim 11, wherein the instructions further cause the processor to create a custom next hop resolution configuration, wherein the custom next hop resolution configuration is configured to use the custom routing table to resolve a particular routing protocol path and use the predefined routing table to resolve the particular routing protocol path when the custom routing table is unable to resolve the particular routing protocol path.

13. The first network device of claim 11, wherein resolving the particular routing protocol path comprises performing a lookup in the custom routing table based on the particular routing protocol path and, based on the lookup, determining a next hop for the routing protocol path.

14. The first network device of claim 11, wherein the predefined routing table is a unicast routing information base (RIB) included in a control plane of the first network device.

15. The first network device of claim 11, wherein the instructions further cause the processor to create a custom next hop resolution configuration, wherein the custom next hop resolution configuration is configured to use the predefined routing table to resolve a particular routing protocol path, and use the custom routing table to resolve the particular routing protocol path when the predefined routing table is unable to resolve the particular routing protocol path.

16. The first network device of claim 11, wherein the instructions further cause the processor to:
receive, through a first protocol in the subset of the set of routing protocols, a first route having a first route address;
receive, through a second protocol in the subset of the set of routing protocols, a second route having a second route address, wherein the first route address and the second route address are the same; and
based on a first preference value specified for the first protocol and a second preference value specified for the second protocol, select one of the first and second routes to populate in the custom routing table.

17. The first network device of claim 11, wherein the set of routing protocols used by the predefined routing table of the first network device to determine next hops for routing protocol paths comprises a set of tunneling protocols.

18. The first network device of claim 11, wherein the instructions further cause the processor to create a route processing configuration for the custom routing table, wherein the route processing configuration is configured to populate the custom routing table with routes received through a routing protocol in the subset of the set of routing protocols having addresses that are included in a set of route addresses, and drop routes received through the routing protocol in the subset of the set of routing protocols having addresses that are not included in the set of route addresses.

19. The first network device of claim 18, wherein the route processing configuration is further configured to use a first preference value for a first route receive through the routing protocol having a first route address that is not the same as a particular route address in the set of route addresses and use a second preference value for a second route received through the routing protocol having a second route address that is the same as the particular route address in the set of route addresses.

20. The first network device of claim 11, wherein the instructions further cause the processor to configure a custom preference table to store custom preference values for populating the custom routing table.

* * * * *